(12) United States Patent
Ishida et al.

(10) Patent No.: US 8,177,669 B2
(45) Date of Patent: May 15, 2012

(54) PULLEY STRUCTURE

(75) Inventors: Tomokazu Ishida, Tanigaminishi-machi (JP); Shgeru Kawamoto, Shiga (JP); Takeo Shimizu, Kyoto (JP)

(73) Assignee: Mitsuboshi Belting Ltd. (JP)

( * ) Notice: Subject to any disclaimer, the term of this patent is extended or adjusted under 35 U.S.C. 154(b) by 707 days.

(21) Appl. No.: 11/590,404

(22) Filed: Oct. 31, 2006

(65) Prior Publication Data
US 2007/0123380 A1    May 31, 2007

(30) Foreign Application Priority Data

| | | |
|---|---|---|
| Oct. 31, 2005 | (JP) | 2005-315705 |
| Nov. 29, 2005 | (JP) | 2005-344527 |
| Dec. 28, 2005 | (JP) | 2005-377367 |
| Dec. 28, 2005 | (JP) | 2005-378548 |
| Jul. 28, 2006 | (JP) | 2006-205451 |
| Aug. 2, 2006 | (JP) | 2006-210901 |
| Sep. 6, 2006 | (JP) | 2006-241296 |

(51) Int. Cl.
*F16D 3/00* (2006.01)
*F16H 55/14* (2006.01)
*F16H 55/36* (2006.01)

(52) U.S. Cl. .......................... 474/94; 474/166

(58) Field of Classification Search .................. 474/135, 474/74, 69, 70, 190, 171; 464/57, 60; 192/41 S, 192/75, 81 C
See application file for complete search history.

(56) References Cited

U.S. PATENT DOCUMENTS

| | | | | |
|---|---|---|---|---|
| 2,042,400 A | * | 5/1936 | Hon | 351/112 |
| 2,060,406 A | * | 11/1936 | Tiede | 206/537 |
| 2,141,014 A | * | 12/1938 | Nutt | 192/207 |
| 2,407,757 A | * | 9/1946 | MacCallum | 192/84.94 |
| 2,595,454 A | * | 5/1952 | Greenlee | 464/40 |
| 2,866,349 A | * | 12/1958 | Heckethorn | 74/336 R |
| 2,885,896 A | * | 5/1959 | Hungerford, Jr. et al. | 474/70 |
| 2,897,680 A | * | 8/1959 | Fritsch | 74/126 |
| 3,004,453 A | * | 10/1961 | Lang | 475/166 |
| 3,048,056 A | * | 8/1962 | Wolfram | 74/665 R |
| 3,304,924 A | * | 2/1967 | Dolza | 123/90.31 |
| 3,395,553 A | * | 8/1968 | Stout | 464/40 |
| 3,442,359 A | * | 5/1969 | Atchison | 192/41 R |
| 3,528,533 A | * | 9/1970 | Sacchini | 192/41 S |
| 3,610,063 A | * | 10/1971 | Hart | 474/94 |
| 3,618,730 A | * | 11/1971 | Mould, III | 192/56.2 |
| 3,828,621 A | * | 8/1974 | Uchino | 474/156 |
| 3,893,554 A | * | 7/1975 | Wason | 464/40 |
| 4,044,628 A | * | 8/1977 | Jacks | 74/574.2 |
| 4,123,187 A | * | 10/1978 | Turner | 408/17 |
| 4,139,995 A | * | 2/1979 | Lamarche | 464/64.1 |
| 4,332,573 A | * | 6/1982 | Uchida et al. | 474/94 |
| 4,393,727 A | * | 7/1983 | Phillips | 476/65 |

(Continued)

*Primary Examiner* — William A Rivera
*Assistant Examiner* — Henry Liu
(74) *Attorney, Agent, or Firm* — Wood, Phillips, Katz, Clark & Mortimer

(57) ABSTRACT

A pulley structure having a first rotating member that is rotatable around a first axis. A second rotating member is rotatable around the first axis and in at least partial axial coincidence with the first rotating member. A spring containing chamber is defined between the first and second rotating members. A spring, having axially spaced first and second ends defined by coils, extends around the first axis. At least one coil at each of the first and second axially spaced ends of the spring is radially biased relative to the first axis to thereby be frictionally held against each of the first and second rotating members to thereby allow forces generated by relative rotation between the first and second rotating members to be transmitted through the spring.

52 Claims, 15 Drawing Sheets

U.S. PATENT DOCUMENTS

| | | | | |
|---|---|---|---|---|
| 4,460,076 A * | 7/1984 | Yamada | | 192/35 |
| 4,619,156 A * | 10/1986 | Kiryu | | 74/640 |
| 4,725,260 A * | 2/1988 | Komorowski et al. | | 474/135 |
| 4,795,012 A * | 1/1989 | Durum | | 464/99 |
| 5,139,463 A * | 8/1992 | Bytzek et al. | | 474/69 |
| 5,156,573 A * | 10/1992 | Bytzek et al. | | 474/74 |
| 5,273,229 A * | 12/1993 | Komatsu | | 242/545.1 |
| RE34,616 E * | 5/1994 | Komorowskip et al. | | 474/135 |
| 5,470,280 A * | 11/1995 | Ayukawa | | 474/135 |
| 5,503,599 A * | 4/1996 | Brehler et al. | | 474/112 |
| 5,593,366 A * | 1/1997 | Puzik | | 474/177 |
| 5,598,913 A * | 2/1997 | Monahan et al. | | 192/41 S |
| 5,695,176 A * | 12/1997 | Colford | | 267/155 |
| 5,725,449 A * | 3/1998 | Park | | 474/94 |
| 5,759,125 A * | 6/1998 | Berg | | 474/112 |
| 5,803,849 A * | 9/1998 | Ayukawa | | 474/94 |
| 5,879,254 A * | 3/1999 | Tanaka | | 474/74 |
| 5,908,095 A * | 6/1999 | Jackel et al. | | 192/70.17 |
| 6,083,130 A * | 7/2000 | Mevissen et al. | | 474/70 |
| 6,109,227 A * | 8/2000 | Mott | | 123/90.31 |
| 6,131,487 A * | 10/2000 | Jackel et al. | | 464/64.1 |
| 6,234,127 B1 * | 5/2001 | Simpson et al. | | 123/90.31 |
| 6,234,925 B1 * | 5/2001 | Walter | | 474/18 |
| 6,264,578 B1 * | 7/2001 | Ayukawa | | 474/135 |
| 6,394,247 B1 * | 5/2002 | Monahan et al. | | 192/41 S |
| 6,547,227 B1 * | 4/2003 | Mende | | 267/168 |
| 6,622,839 B2 * | 9/2003 | Kundermann et al. | | 192/48.9 |
| 6,761,656 B2 * | 7/2004 | King et al. | | 474/74 |
| 6,923,303 B2 * | 8/2005 | Liston et al. | | 192/41 S |
| 7,011,593 B2 * | 3/2006 | Schenk et al. | | 474/199 |
| 7,052,420 B2 * | 5/2006 | King et al. | | 474/74 |
| 7,153,227 B2 * | 12/2006 | Dell et al. | | 474/70 |
| 7,207,910 B2 * | 4/2007 | Dell et al. | | 474/74 |
| 7,273,028 B1 * | 9/2007 | Ho | | 123/192.2 |
| 7,399,245 B2 * | 7/2008 | Spintzyk | | 474/94 |
| 7,445,206 B2 * | 11/2008 | Lee | | 271/117 |
| 2004/0014540 A1 * | 1/2004 | Dell et al. | | 474/70 |

* cited by examiner

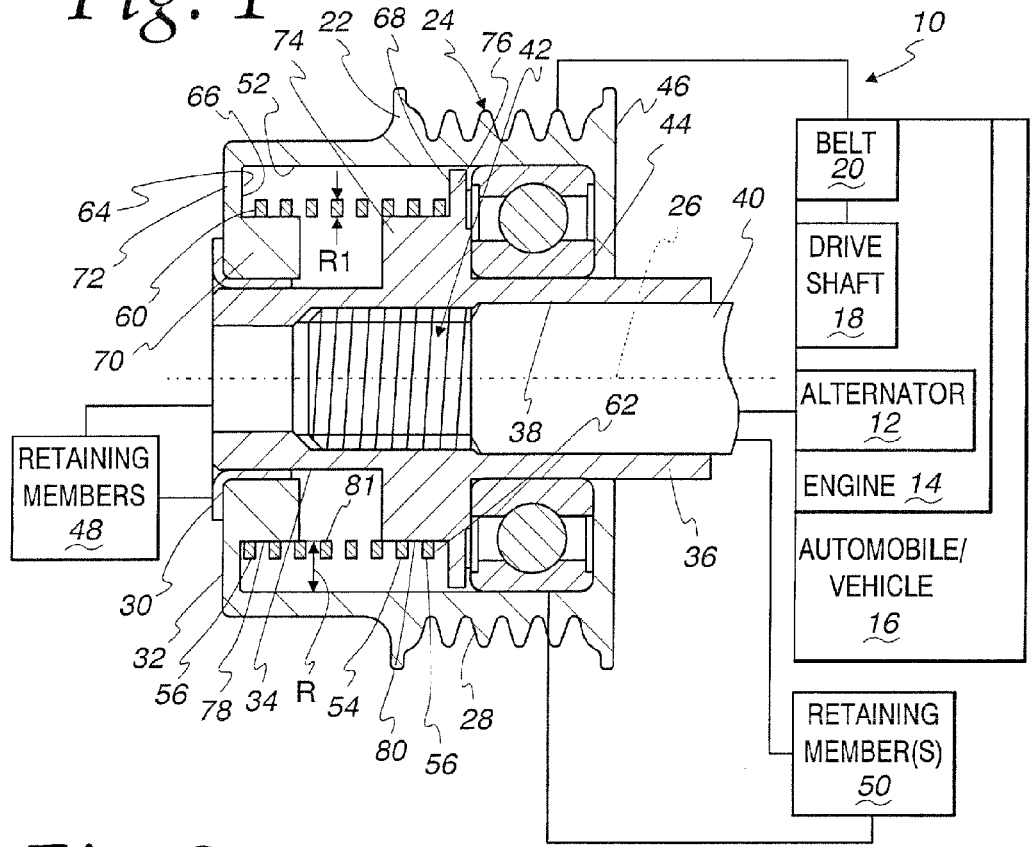
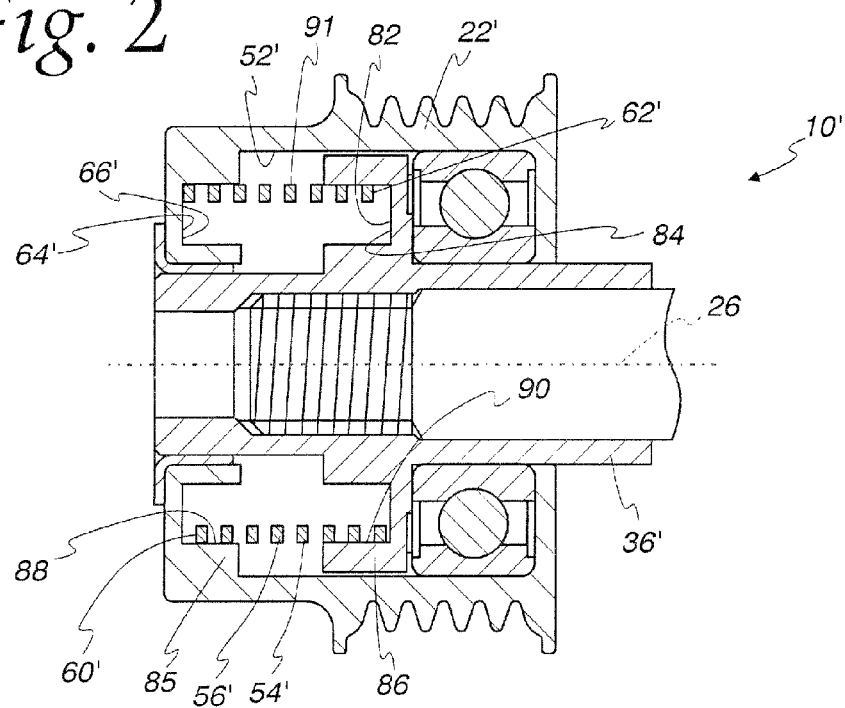

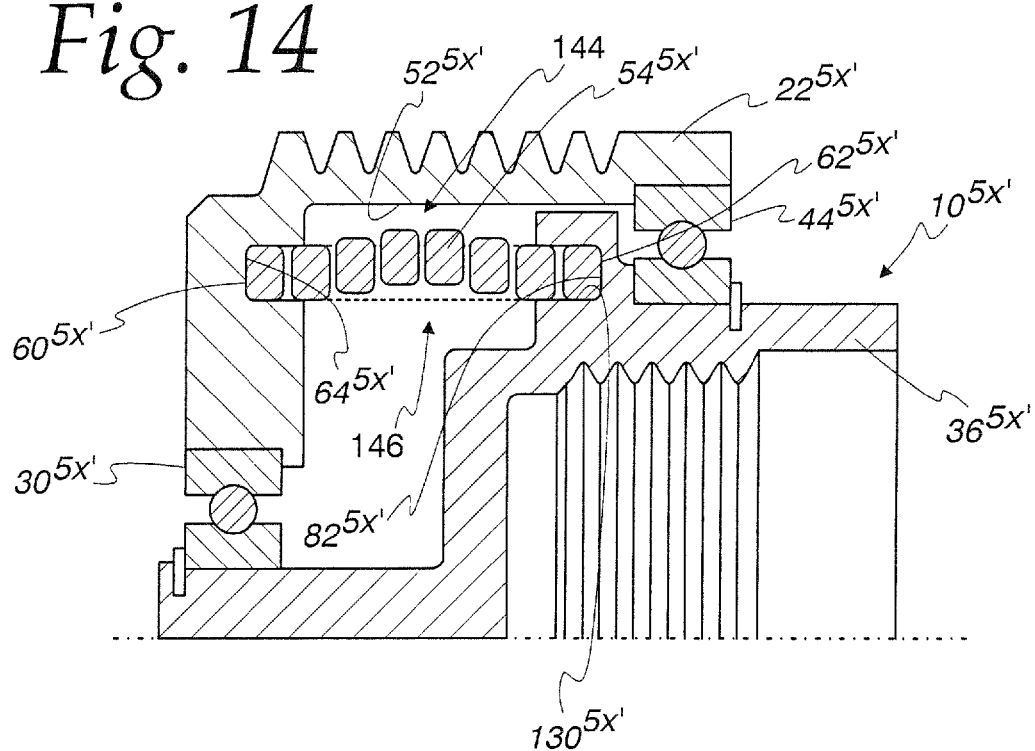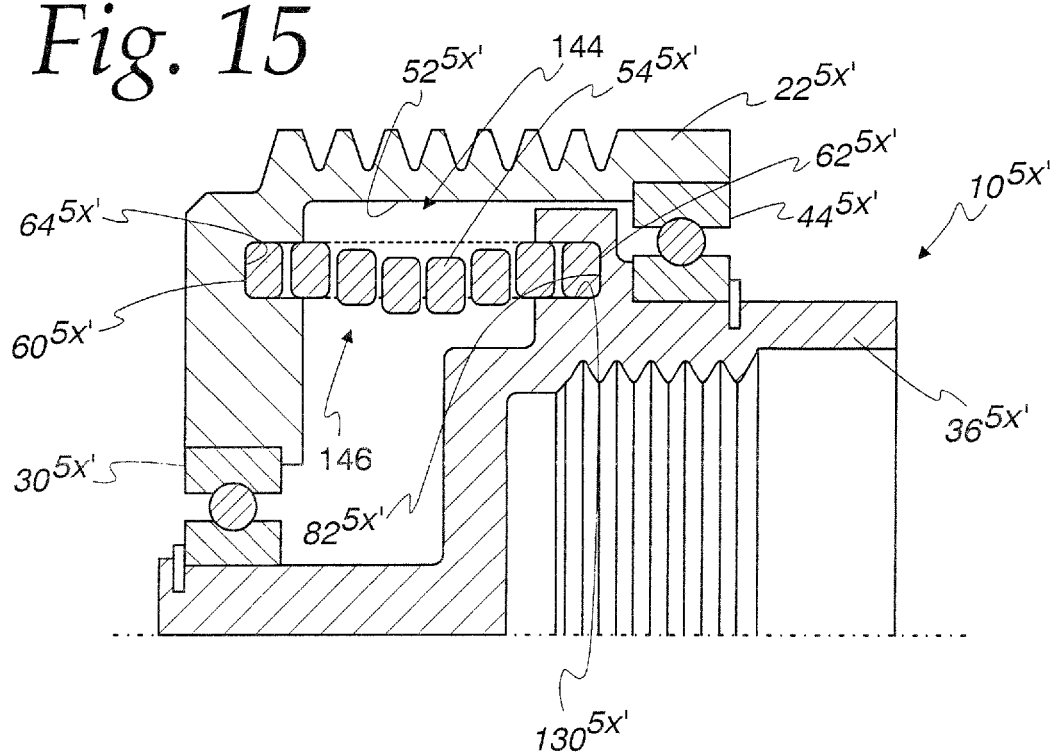

PULLEY STRUCTURE

BACKGROUND OF THE INVENTION

1. Field of the Invention

This invention relates to pulley structures including two relatively rotatable members that are interconnected so that rotative forces applied to either of the rotatable members are transmitted through a resilient connection to the other of the rotatable members.

2. Background Art

Alternators are provided on automobiles to generate power. The alternator is generally belt driven off of the engine crank shaft. With internal combustion engines, the crank shaft may be repeatedly accelerated and decelerated, whereby variable forces are imparted to an associated belt that drives the alternator.

Generally, alternators have a rotating member/shaft with a large moment of inertia. In the event that there is a change in speed of the crank shaft, a rotating member/pulley, connected to the rotating member/shaft to drive the rotating member/shaft, and driven by the belt, slips relative to the belt so as to thereby generate noise and potentially cause wear on the belt.

Further, the speed variations induced by the crank shaft to the alternator shaft may cause deterioration of the power generating mechanism of the alternator. This may reduce power generating efficiency and eventually lead to a failure.

Consequently, it is preferred that there be some resilient force transmission structure between the rotating member/pulley and rotating member/alternator shaft to absorb the rotational force variations induced by the crank shaft.

Various force transmission structures have been devised and exist in the prior art. For example, it is known to use an elastic member and a viscous fluid acting between two relatively rotating members, as shown in JP-A-08-240246. The pulley structure therein consists of an elastic member made of rubber and a viscous fluid with a viscosity that increases proportionately to an increase in the shear forces generated when a variation in rotation is brought about between the relatively rotating members. Even when the pulley structure is operated with a torque capable of generating a shear stress equal to or larger than the limit of the elasticity of the elastic member, the displacement angle between the rotating members is restrained by the viscous fluid. The elastic member is thereby prevented from being destroyed by yield or rupture.

A rubber element in a ring shape is used as the elastic member between the rotating members. Deformation thereof is dictated by the degree of elasticity for this component. A desired amount of relative angular displacement between the two rotating members may thus not be achievable.

Additionally, while rotational force variations between the crank shaft and alternator can be absorbed by the combined effect of the elastic member and viscous fluid, the belt with this system is subject to being resonated in response to variations in tension thereon, whereby noise may be emitted. This may also have an adverse influence on the durability of the belt.

Another known pulley structure is shown in Japanese Patent Publication No. 3357391. The pulley structure therein is provided only with an elastic member between two relatively rotatable members. The elastic member is a coil spring with a spiral portion at one end, a securing end portion bent to be offset in a radial direction at the other end, and a middle spiral portion therebetween.

The one end portion is provided with an inner diameter capable of being frictionally engaged with a cylindrical surface of one of the rotating members. The other end portion is fit in a groove with a circular arcuate shape in the other rotating member and is secured to the other rotating member by an end portion that is offset in a radial direction.

The rotating members are engaged to be rotated together so long as there is positive torque imparted by movement of an associated belt. The middle spiral portion enables one rotating member to rotate elastically instantaneously in a reverse direction relative to the other rotating member.

Further, in the event that the rotational speed of the crank shaft is reduced to a degree sufficient that a predetermined negative torque is applied between the two rotating members, the spiral portion at the one end, frictionally engaged with a surface of the associated rotating member, experiences a slipping/detaching action resulting from rotating the other rotating member at a speed exceeding the rotational speed of the one rotating member.

A large relative angular displacement between the first rotating members is made possible by the coil spring and therefore a variation in the tension on the belt can be reduced. This in turn reduces noise by reason of belt slippage and improves the durability of the belt. Further, by combining a coupling/detaching mechanism with a one way clutch feature, manufacturing costs may be controlled. The problem of belt resonance, and noise generation and belt deterioration associated therewith, are not as prevalent with this structure as with the previously described prior art structure. In this structure, relative displacement between the rotating members may have an adequate angular range.

However, while the one end portion of the coil spring is contained in the arcuate groove in its associated rotating member, it is locked thereto through the bent end portion. Relative rotational movement of the members resulting from variation in rotational speeds may cause a stress concentration at the bent spring end. There is thus a concern of subjecting the locked, bent end portion of the coil spring to fatigue rupture after repeated stresses generated each time speed variations are encountered.

It is also known to drive an alternator pulley through a belt on a serpentine drive mechanism on an automobile, as shown in Japanese Patent Publication No. 3268007. The alternator has a hub structure rotated together with an armature assembly and an alternating current generator pulley attached to the hub structure. A coil spring is interposed between the hub structure and the alternating current generator pulley and secured by fixing ends thereof to each of the hub structure and alternating current generator pulley. The belt transmits a driving rotational movement through the alternator current generator pulley. The hub structure can be elastically rotated to move relative to the alternating current generator pulley in a reverse direction. The end portions of the coil spring are bent to be offset in a radial direction, with the end portions retained in receptacles provided in the hub structure and the alternating current generator pulley.

Stress concentration at the end portions of the coil fixed to the hub structure and/or the alternating current generator pulley may lead to destruction of the coil spring in a relatively short time period.

SUMMARY OF THE INVENTION

In one form, the invention is directed to a pulley structure having a first rotating member that is rotatable around a first axis. A second rotating member is rotatable around the first axis and in at least partial axial coincidence with the first rotating member. A spring containing chamber is defined between the first and second rotating members. A spring, having axially spaced first and second ends defined by coils, extends around the first axis. At least one coil at each of the first and second axially spaced ends of the spring is radially biased relative to the first axis to thereby be frictionally held against each of the first and second rotating members to thereby allow forces generated by relative rotation between the first and second rotating members to be transmitted through the spring.

In one form, the first end of the spring consists of a first plurality of coils having a first relaxed diameter and at least a first coil in the first plurality of coils is elastically deformed to be changed from the first relaxed diameter to a first loading diameter, whereby a resulting residual elastic force radially biases the at least first coil against the first rotating member so that the at least first coil is thereby frictionally held against the first rotating member to follow rotational movement of the first rotating member around the first axis.

In one form, the second end of the spring consists of a second plurality of coils having a second relaxed diameter and at least a second coil in the second plurality of coils is elastically deformed to be changed from the second relaxed diameter to a second loading diameter, whereby a resulting residual elastic force radially biases the at least second coil against the second rotating member so that the at least second coil is thereby frictionally held against the second rotating member to follow rotational movement of the second rotating member around the first axis.

In one form, the spring is connected to the first and second rotating members only by frictional holding forces between the at least first and second coils and the first and second rotating members.

In one form, at least one of the at least first and second coils is reduced in diameter by reason of being changed from its relaxed diameter into its loading diameter to thereby exert a radially outward holding force on at least one of the first and second rotating members.

In one form, at least one of the at least first and second coils is increased in diameter by reason of being changed from its relaxed diameter into its loading diameter to thereby exert a radially inward holding force on at least one of the first and second rotating members.

In one form, one of the first and second rotating members has an axially projecting spring holding portion and at least one coil in one of the first and second plurality of coils exerts a radial holding force on the spring holding portion.

In one form, the spring holding portion has a radially outwardly facing surface against which the at least one coil in the one of the first and second plurality of coils exerts a radial holding force.

In one form, one of the first and second rotating members has a radially facing surface against which at least one coil in one of the first and second plurality of coils is frictionally held. The radially facing surface has a first portion with a substantially uniform diameter against which at least one coil bears, and the radially facing surface has a second portion that has a tapered diameter that is axially spaced from the first portion.

In one form, the one of the first and second rotating members with the radially facing surface has an axially projecting spring holding portion with a terminal end and the second portion extends from the terminal end axially to the first portion of the radially facing surface.

In one form, the first portion of the radially facing surface faces radially outwardly.

In one form, the first rotating member has a first axially opening recess into which the spring extends.

In one form, the second rotating member has a second axially opening recess into which the spring extends.

In one form, the first and second axially opening recesses open towards each other.

In one form, the first rotating member has an axially projecting spring holding portion and at least one coil in one of the first and second plurality of coils exerts a radial holding force on the spring holding portion.

In one form, the first portion of the radially facing surface faces radially inwardly.

In one form, the spring is a coil spring with coils, each with a diameter, extending fully between the axially spaced first and second ends, and the coils have different diameters.

In one form, one of the first and second rotating members has a spring holding portion with a radially outwardly facing surface. At least one coil at one of the axially spaced ends of the spring has a first diameter that surrounds the radially outwardly facing surface on the spring holding portion and the coil spring has at least a second coil between the axially spaced ends that has a second diameter that is greater than the first diameter.

In one form, the second coil does not engage either of the first or second rotating members.

In one form, the uniform diameter of the first portion of the radially facing surface is centered on the first axis.

In one form, the at least one coil exerts a radial outward holding force on the spring holding portion.

In one form, one of the first and second rotating members has an axially extending spring holding portion with a radially outwardly facing surface. At least one coil at one of the axially spaced ends has a first diameter that surrounds the radially outwardly facing surface on the spring holding portion. The coil spring has at least a second coil between the axially spaced ends that has a second diameter that is less than the first diameter.

In one form, the second coil surrounds the radially outwardly facing surface on the spring holding portion.

In one form, one of the first and second rotating members has an axially extending holding portion with a radially inwardly facing surface. At least one coil at one of the axially spaced ends has a first diameter that engages the radially inwardly facing surface on the spring holding portion.

In one form, the coil spring has at least a second coil between the axially spaced ends that has a second diameter less than the first diameter.

In one form, the spring is defined by coils extending continuously between the first and second axially spaced ends. The spring has a free end that faces circumferentially and one of the first and second rotating members has a circumferentially facing stop surface that is engageable with the free end of the spring.

In one form, the coils have a substantially uniform diameter between the first and second axially spaced ends.

In one form, the one of the first and second rotating members has an axially opening, arcuate recess within which the stop surface is located.

In one form, one of the first and second rotating members has a radially facing surface having a non-uniform diameter that engages the spring.

In one form, the radially facing surface has a diameter that changes progressively in an axial direction.

The radially facing surface may have a spiral shape.

In one form, the spring engages the radially facing surface over at least a part of the spiral shape.

In one form, the spiral shape has a diameter and the spring has at least one coil with a relaxed diameter that is less than the diameter of at least a part of the spiral shape and must be increased to a loading diameter to allow the spring to engage the radially facing surface over the at least part of the spiral shape.

In one form, the spring has coils with a cross-sectional shape that is quadrangular.

In one form, one of the first and second plurality of coils and first and second rotating members cooperate so that application of a rotational force of a first magnitude to the one of the first and second rotating members causes the one of the first and second rotating members to circumferentially stop relative to the one of the first and second plurality of coils.

In one form, one of the first and second plurality of coils and first and second rotating members cooperate so that an increase in rotational speed per unit time of the one of the first and second rotating members, equal to or greater than a predetermined amount, causes slippage circumferentially between the one of the first and second rotating members and the one of the first and second plurality of coils.

In one form, one of the first and second plurality of coils and first and second rotating members cooperate so that a decrease in rotational speed per unit time, equal to or greater than a predetermined amount, causes slippage circumferentially between the one of the first and second rotating members and the first and second plurality of coils.

In one form, the first rotating member has a radially facing surface, against which at least one coil exerts a radial frictional holding force, that is subjected to a hardening treatment.

In one form, the first rotating member has a radially facing surface against which at least one coil exerts a radial frictional holding force, wherein the radially facing surface is altered to change the friction characteristics of the radially facing surface.

In one form, the radially facing surface is altered by forming discrete grooves and/or depressions therein.

In one form, the at least one coil has a quadrangular cross-sectional shape and a circumferentially facing free end. The at least one coil has a radially facing surface. The radially facing surface and free end meet at a corner that is rounded.

In one form, the at least one coil has a quadrangular cross-sectional shape and a radially facing surface that frictionally engages the first rotating member and is rounded to produce a crown.

In one form, the at least one coil has a quadrangular cross-sectional shape and a radially facing surface that frictionally engages the first rotating member. The spring has a circumferentially facing free end and there is a radial gap between the radially facing surface and the first rotating member adjacent to the circumferentially facing free end of the spring.

In one form, the first member has a radially facing surface and the spring has an attaching region that engages the radially facing surface and a transition region that is in axial coincidence with the radially facing surface but does not engage the radially facing surface.

In one form, the spring has a plurality of coils extending continuously between the first and second axially spaced ends of the spring and the coils at the attaching and transition regions have diameters less than a diameter of at least one coil between the axially spaced ends of the spring.

In one form, the first member has an axially opening recess with radially inwardly and outwardly facing surfaces spaced by a first distance and the at least one coil at the first end of the spring extends into the axially opening recess.

In one form, the at least one coil has a radial cross-sectional dimension that is substantially greater than the first distance.

In one form, the at least one coil has a radial cross-sectional dimension that is approximately equal to the first distance.

In one form, the spring has a plurality of coils between the first and second axially spaced ends that do not engage either of the first or second rotating members.

In one form, the spring containing chamber has a portion within which the plurality of coils between the first and second axially spaced ends can expand radially.

In one form, the spring containing chamber has a portion within which the plurality of coils between the first and second axially spaced ends can contract radially.

In one form, one of the coils has an circumferentially facing free end and the first rotating member has a circumferentially facing stop surface that is abuttable to the circumferentially facing free end.

BRIEF DESCRIPTION OF THE DRAWINGS

FIG. 1 is a cross-sectional view of one form of pulley structure, according to the present invention, used in an exemplary environment on an alternator on an automobile/vehicle engine and having a first rotating pulley member and a second rotating member interconnected for force transmission therebetween by a coil spring;

FIG. 2 is a view as in FIG. 1 of a modified form of pulley structure;

FIG. 14 is a view as in FIG. 9 of a further modified form of pulley structure wherein the rotating members are relatively situated to relax a force transmitting coil spring;

FIG. 15 is a view as in FIG. 14 wherein the rotating members are relatively positioned to tighten the coil spring;

DETAILED DESCRIPTION OF THE DRAWINGS

Figure 3:
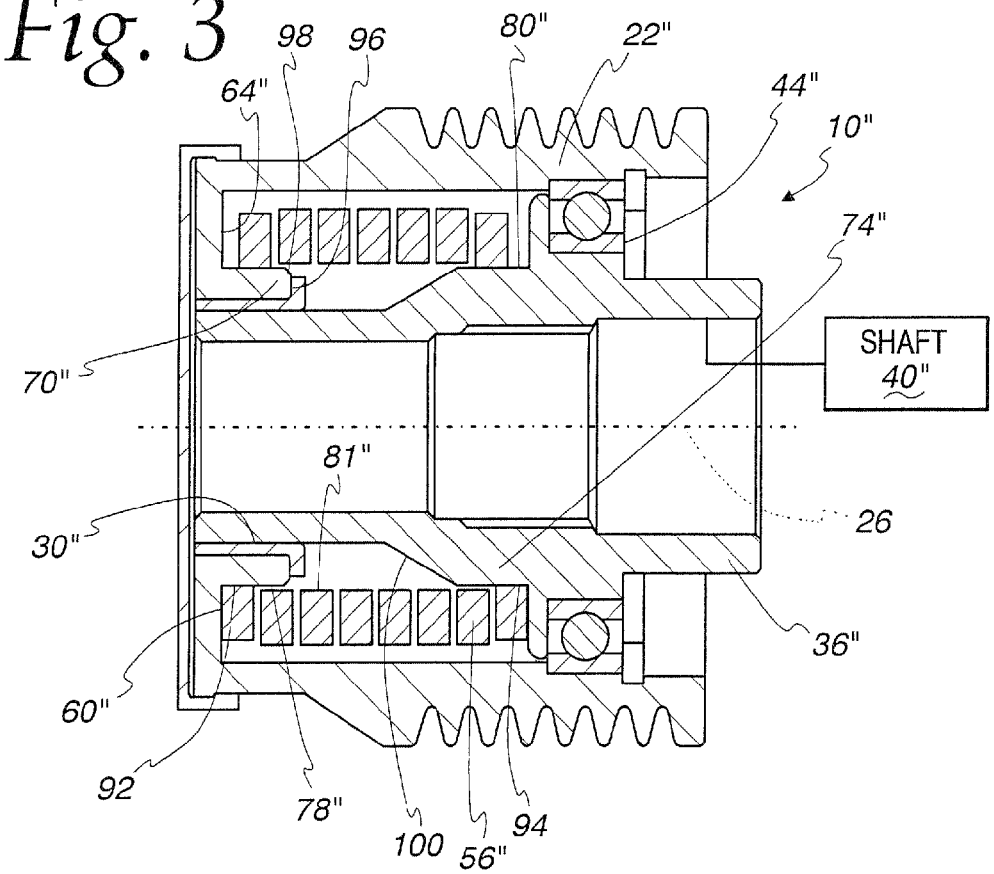
FIG. 3 is a view as in FIG. 2 of a further modified form of pulley structure.

In FIG. 1, a pulley structure, according to the present invention, is shown at 10. While the pulley structure 10 can be used in virtually an unlimited number of different devices in virtually an unlimited number of different environments, it is shown in one exemplary form in FIG. 1 in association with an alternator 12 on an engine 14, as on an automobile 16, or other vehicle. The engine 14 has a drive shaft 18 that, through a belt 20, drives a first rotating member 22 by engaging a pulley section 24 thereon. The first rotating member 22 has a generally cylindrical shape for movement around a first axis 26. The pulley section 24 has a radially outwardly facing surface 28 that is configured to accommodate a V-ribbed belt 20.

A bearing 30 resides between the first rotating member 22 at a first axial end 32 of the first rotating member 22 and a radially outwardly facing surface 34 on a second rotating member 36 that is part of the pulley structure 10. The second rotating member 36 has a bore 38 within which an alternator shaft 40 is secured, as through a threaded connection at 42, so that the alternator shaft 40 and second rotating member 36 move as one piece around the first axis 26. A second bearing 44 resides between the first rotating member 22 and the second rotating member 36 adjacent to the axial end 46 of the first rotating member 22, opposite to the end 32 thereof.

One or more retaining members 48 cooperate between the first bearing 30 and second rotating member 36 to prevent separation of the first bearing 30 therefrom. One or more like retaining members 50 are provided to cooperate between the second bearing 44 and second rotating member 36 to likewise prevent separation of the second bearing 44 therefrom.

With this arrangement, the first and second bearings 30, 44 guide relative rotational movement between the first and second rotating members 22, 36 around the first axis 26, with the second rotating member 36 residing at least partially radially within the first rotating member 22 and in at least partial axial coincidence therewith.

A spring containing chamber 52 is formed between the first and second rotating members 22, 36 and first and second bearings 30, 44. A spring 54, having at least one coil/turn 56 at each of first and second axial opposite ends thereon, 60, 62, respectively, resides within the spring containing chamber 52. The coils 56 at the spring ends 60, 62 constitute spring mounting portions thereof that directly interact with the first and second rotating members 22, 36. Preferably, the spring 54 is a coil spring with each of the turns having a quadrangular, cross-sectional shape, that will typically be square or rectangular. The coils/turns are spaced from each other in an axial direction so that there is an axial gap between the coils/turns.

The coil spring 54 resides within an axially opening recess/groove 64 defined by the first rotating member 22. Axial movement of the coil spring 54 is confined by an axially facing surface 66 at the base of the recess 64 and a surface 68 on the second rotating member 36 facing axially oppositely, and towards, the surface 66. The surfaces 66, 68 thus bound the axial dimensions of the spring containing chamber 52. The axially opening recess 64 has a radial dimension R that is substantially greater than the radial, cross-sectional dimension R1 of the coils 56 extended thereinto.

The first rotating member 22 has an axially projecting, first spring holding portion 70. The spring holding portion 70 projects axially from a radial flange 72 on the first rotating member 22 and is formed as one piece therewith.

A second spring holding portion 74 is formed on the second rotating member 36 and is formed as one piece with, and projects axially from, a radial flange 76 on the second rotating member 36.

At least one, and potentially a plurality of coils 56 at the axial end 60 of the coil spring 54 surrounds, to directly engage, a radially outwardly facing surface 78 on the first spring holding portion 70 that rotates at all times as one piece with the first rotating member. The surface 78 has a substantially uniform diameter centered on the axis 26. At least one, and potentially a plurality of coils 56 at the second axial end 62 of the coil spring 54 surrounds, to directly engage, a radially outwardly facing surface 80 on the second rotating member 36 that rotates at all times as one piece with the second rotating member 36. The radially outwardly facing surface 80 also has a substantially uniform diameter centered on the axis 26. The coil(s) 56 are frictionally borne against the radially outwardly facing surface 78 over an attaching region at the spring end 60, with the coil(s) 56 likewise frictionally borne against the radially outwardly facing surface 80 over an attaching region at the spring end 62.

The coils 56 have a relaxed diameter, as with the spring 54 separated from the remainder of the pulley structure 10 and isolated without any forces acting thereupon. The relaxed diameters are less than the diameters of the radially outwardly facing surfaces 78, 80. As a result, the coils 56 must be radially enlarged to be placed around their respective surfaces 78, 80 so that the inside surfaces 81 thereon thereby have an enlarged, loading diameter. As a result, there is a residual elastic force in the coils 56 that radially biases the coils 56 to be frictionally held against the surfaces 78, 80, thereby producing radial holding forces. These radial holding forces cause the coils 56 to be frictionally held to the first and second rotating members 22, 36 to cause the attaching regions of the coil spring 54 to follow rotational movement thereof around the first axis 26.

Through this arrangement, assembly of the coil spring 54 into its operative position is facilitated. The diameters of the insides of the coils 56 can be enlarged sufficiently to allow the coils 56 to axially coincide with, and surround, the surfaces 78, 80 on the first and second spring holding portions 70, 74. Thus, the connection between the coil spring 54 and each of the first and second rotating members 22, 36 can be accomplished, preferably without requiring the use of separate fasteners. The attaching regions of the coils 56 can, through this arrangement, be securely held to follow rotational movement of the first and second rotating members 22, 36.

While many different modifications are contemplated for this and other embodiments herein, as one example, to avoid slippage between the coil spring 54 and first and second rotating members 22, 36, the inner diameters of the coils 56 at the ends 60, 62 of the spring 54 are smaller than those at the center region axially therebetween, thereby to increase the holding forces between the coil spring 54 and spring holding portions 70, 74. Thus, while a uniform diameter spring 54 is contemplated, variations from this configuration are contemplated.

In this embodiment, and other embodiments disclosed herein, a substantial axial extent of the spring 54, between its axial ends, is designed to remain radially unsupported and out of contact with the first and second rotating members 22, 36 at all times.

A modified form of pulley structure is shown at 10' in FIG. 2. The pulley structure 10' consists of corresponding first and second rotating members 22', 36' which function in the same manner as the aforementioned first and second rotating members 22, 36, but is differentiated by reason of the structure that cooperates directly with the coil spring 54'.

In this embodiment, the first rotating member 22' has an axially opening recess 64' with a like, axial opening recess 82 defined on the second rotating member 36'. The spring containing chamber 52' is bounded by axially oppositely facing surfaces 66', 84, respectively at the bases of the recesses 64', 82.

The first and second rotating members 22', 36' respectively have first and second spring holding portions 85, 86. The spring holding portion 85 has a radially inwardly facing surface 88, with the spring holding portion 86 having a radially inwardly facing surface 90.

In this embodiment, the coils 56' each has a relaxed diameter with an outside surface 91 thereon that is greater than the diameter of the surfaces 88, 90, respectively on the first and second rotating members 22', 36'. Accordingly, to place the coil spring 54' in its operative position, the coils 56' must be radially constricted to a loading diameter. By doing so, there is a residual elastic force that biases the coils 56' radially outwardly to against the surfaces 88, 90. Through this arrangement, a radial holding force is produced between the coils 56' and the surfaces 88, 90 at the attaching regions at the axial coil ends, 60', 62'. As a result, the residual elastic forces in the coils 56' radially biases the coils 56' so that they are frictionally held against the surfaces 88, 90, to follow movement thereof around the first axis 26.

With this configuration, the spring 54' can be placed in its operative position by reducing the diameters of the coils 56' from their relaxed diameters and directing the first and second axial ends 60', 62' respectively into the axially opening recesses 64', 82 so as to thereby cause the coils 56' to frictionally engage, and be held to, the surfaces 88, 90. This can be done, as in the prior embodiment, to adequately hold the coil spring 54' to the first and second rotating members 22', 36', to follow movement thereof, through only these frictional forces, without requiring any separate fasteners.

While in FIG. 1, the coils 56 are increased in diameter by reason of being changed between their relaxed and loading diameters at each axial end 60, 62, and the coils 56' at both axial ends 60', 62' are decreased in diameter by reason of being changed from their relaxed diameters to their loading diameters, it is contemplated that, in all embodiments herein, one end of the coil spring 54, 54' could be reduced in diameter, while the other end is increased in diameter by reason of the coils being changed from their relaxed diameters into their loading diameters to effect placement thereof in an operative position with respect to the rotating members 22, 22', 36, 36'.

While the spring 54' is shown as having a uniform diameter between its ends 60', 62', to increase the frictional holding force between the spring ends 60', 62' and the surfaces 88, 90, the diameter of the coil spring 54' may be made larger at the center region than at the ends that contact the first and second rotating members 22', 36'.

Figure 4:
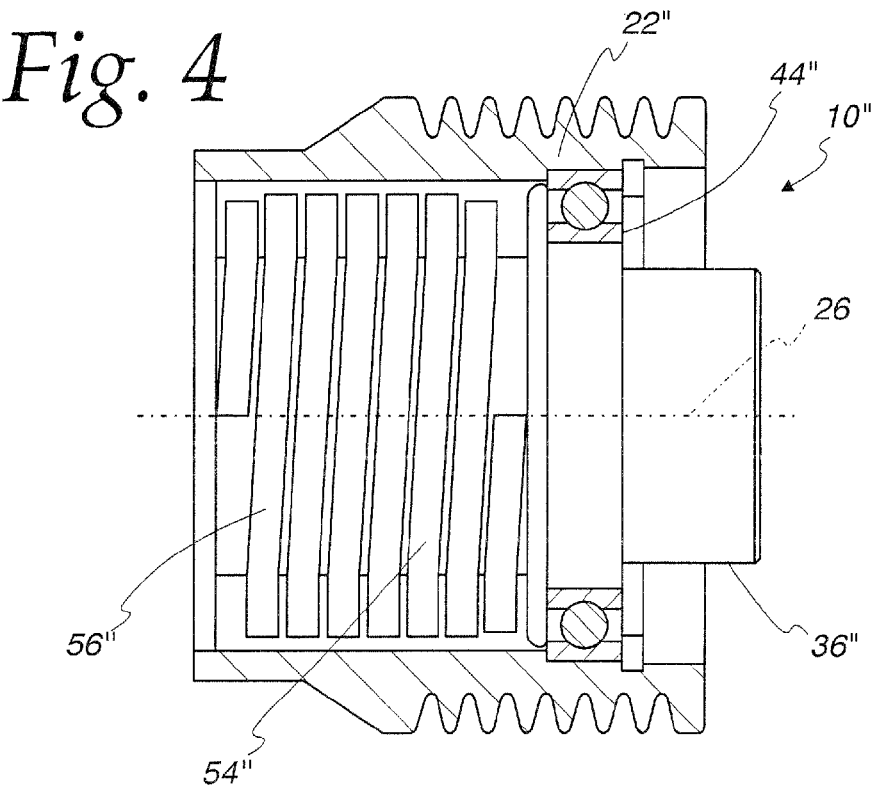
FIG. 4 is a view as in FIG. 3 wherein there is different sectioning of the components.

In FIGS. 3 and 4, a further modified form of pulley structure is shown at 10". The pulley structure 10" is similar to that in FIG. 1, with a first rotating member 22" and second rotating member 36" secured to a modified form of shaft 40", associated with the second rotating member 36". Bearings 30", 44" guide relative rotation between the rotating members 22", 36". The first rotating member 22" has an axially opening recess 64" for receiving one axial end 60" of the coil spring 54". An axially extending spring holding portion 70" has a radially outwardly facing surface 78" to which the inside 81" of the at least one of the coils 56" is frictionally held.

At least one coil 56" is frictionally held to a radially outwardly facing surface 80" on a spring holding portion 74" defined on the second rotating member 36". The inside of the coil spring 54" is increased from its relaxed diameter to place the coil spring 54" in its operative position.

The surfaces 78", 80" respectively have first portions 92, 94 that are engaged by the coils 56", 58", that are substantially uniform in diameter and centered on the axis 26.

The spring holding portion 70" has a terminal end 96. Between the terminal end 96 and the surface portion 92, the surface 78" has a second, inclined portion 98 that progressively changes in diameter, increasing away from the terminal end 96 up to the diameter of the first portion 92.

The surface 80" has a like, second, inclined portion 100 that is spaced axially from the portion 94 and increases in diameter as it approaches the surface portion 94.

The inclined portions 98, 100 facilitate assembly by progressively enlarging the diameter of the coil spring 54", as it is axially moved thereagainst. With the coil spring 54" in its operative position, preferably the coils 56" bear only upon the surface portions 92, 94 and do not bear against the inclined surface portions 98, 100.

Figure 5:
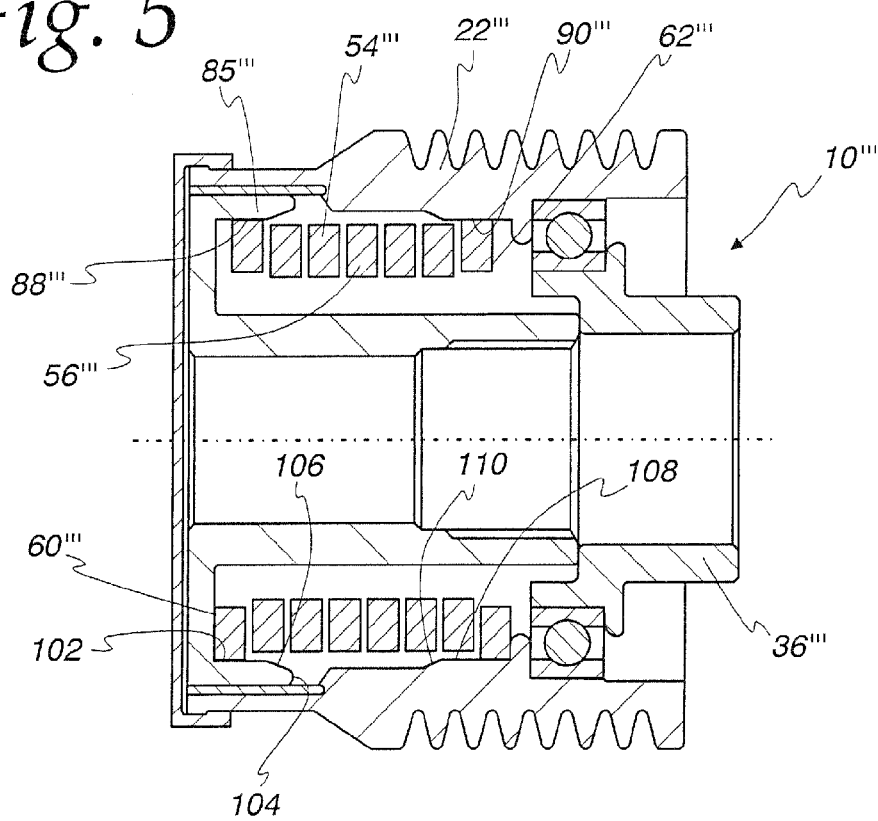
FIG. 5 is a view as in FIG. 3 of a further modified form of pulley structure.

A further modified form of pulley structure is shown at 10''' in FIG. 5. The pulley structure 10''' corresponds to that 10' shown in FIG. 2 in the respect that a coil spring 54''' produces a radial outward holding force upon radially inwardly facing surfaces 88''', 90''' on the first and second rotating members 22''', 36''', respectively. The radially inwardly facing surface 88''' on the spring holding portion 85''' has a first portion 102 that has a substantially uniform diameter. The spring holding portion 85''' has a rounded, terminal end 104 that blends into a second, inclined portion 106 of the surface 88''' that is axially spaced from the surface portion 102. The diameter of the inclined surface portion 106 increases progressively from the terminal end 104 to the surface portion 102.

The surface 90''' has a first portion 108 with a substantially uniform diameter. The surface 90''' has a second, inclined portion 110 that increases in diameter up to the diameter of the first portion 108 and is spaced axially therefrom.

The inclined surface portions 106, 110 facilitate assembly of the coil spring 54''' into its operative position. More specifically, axial movement of the coil spring ends 60''', 62''' against the inclined portions 106, 110 causes the diameter of the coil spring 54''' to progressively decrease, whereby the ends have residual elastic forces that radially bias one or more coils 56''' thereon to against the second rotating member 36''' and first rotating member 22''', respectively.

Preferably, the coils 56''' on the attaching regions of the spring 54''' are frictionally held against the first and second rotating members 22''', 36''' to engage only the surface portions 102, 108 having the uniform diameter, and not the second, inclined surface portions 106, 110.

Figure 6:
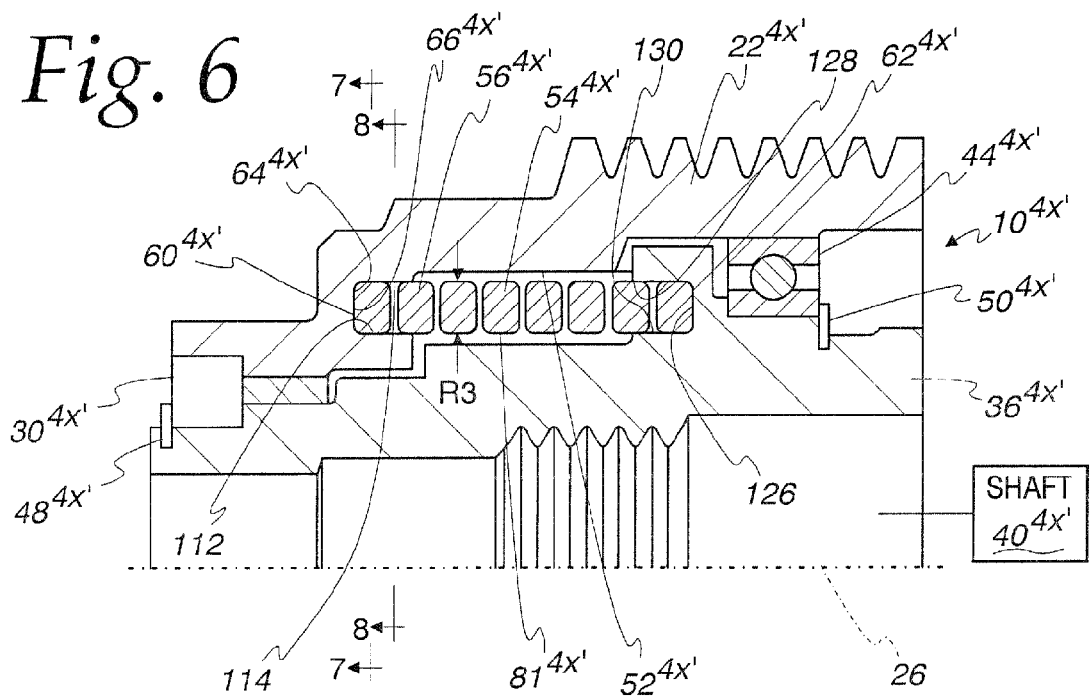
FIG. 6 is a view as in FIG. 5 of one half of a further modified form of pulley structure.
Figure 7:
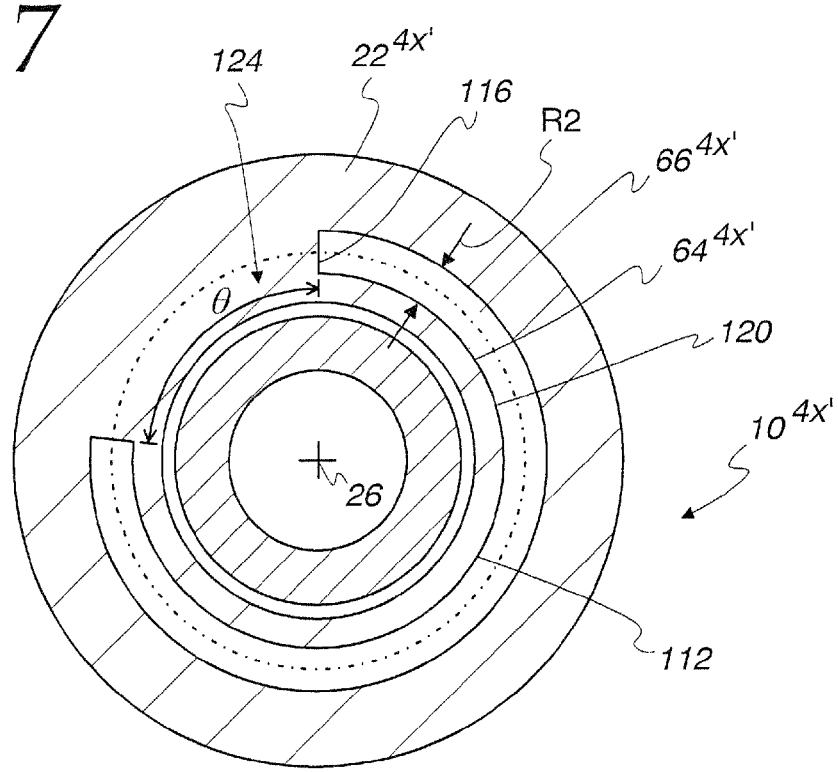
FIG. 7 is a cross-sectional view of the pulley structure taken along line 7-7 of FIG. 6.
Figure 8:
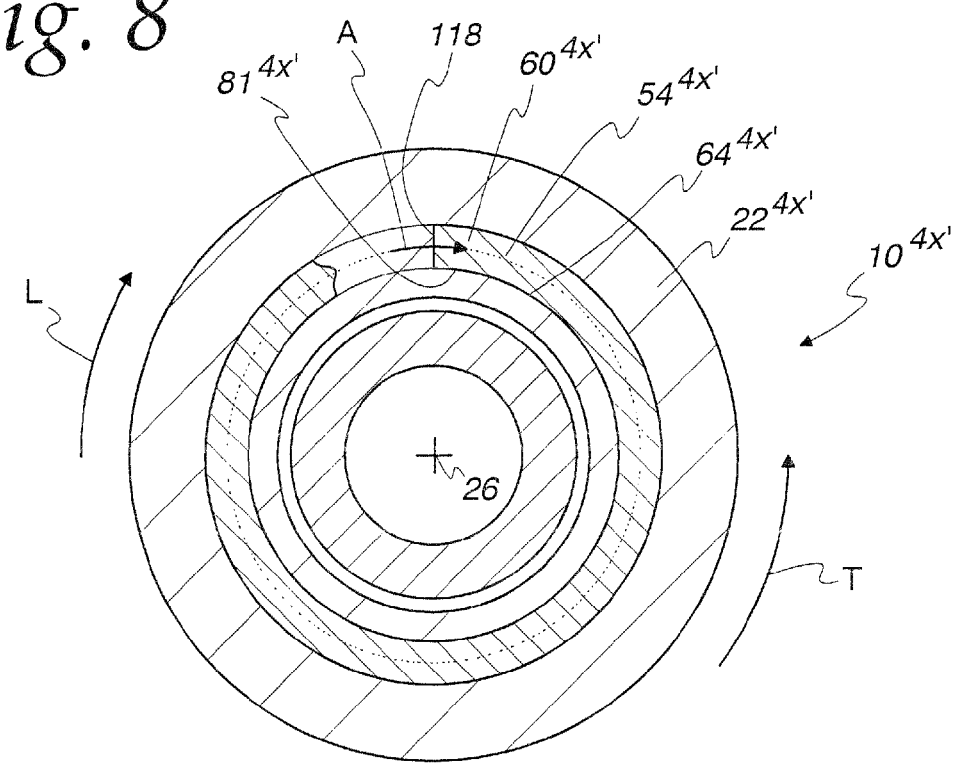
FIG. 8 is a cross-sectional view of the pulley structure taken along line 8-8 of FIG. 6.
Figure 9:
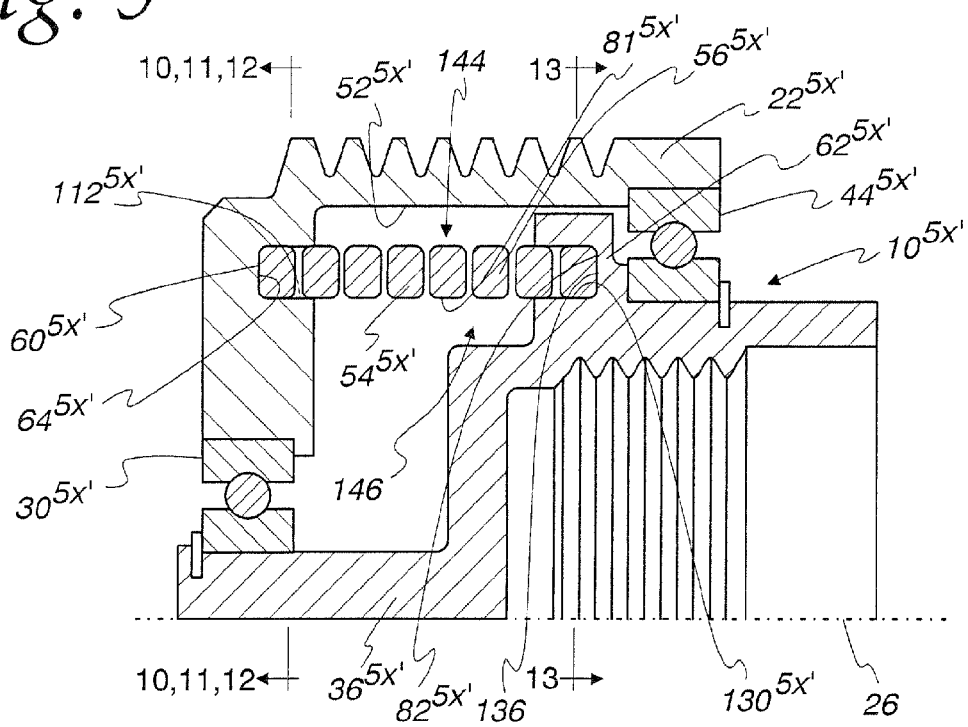
FIG. 9 is a view as in FIG. 6 of a further modified form of pulley structure.
Figure 10:
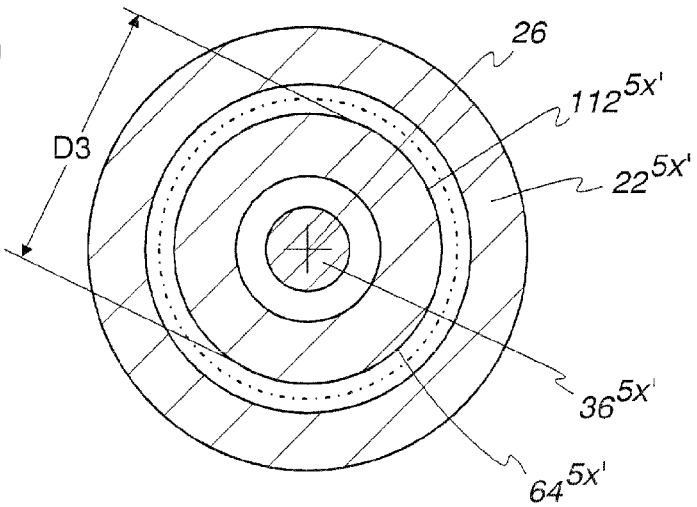
FIG. 10 is a reduced, cross-sectional view of the pulley structure taken along line 10-10 of FIG. 9, with a force transmitting coil spring removed.
Figure 11:
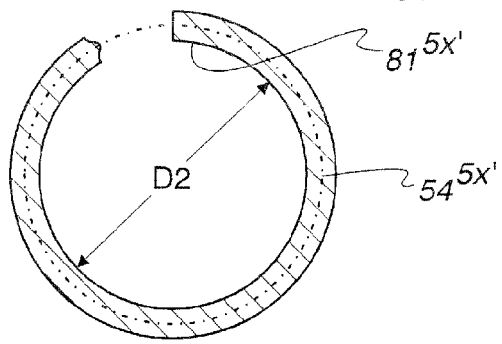
FIG. 11 is a reduced, cross-sectional view of the coil spring taken along line 11-11 of FIG. 9.

A further modified form of pulley structure is shown at 10$^{4x'}$ in FIGS. 6-8. The pulley structure 10$^{4x'}$ consists of a first rotating member 22$^{4x'}$ and a second rotating member 36$^{4x'}$, with the latter connected to a shaft 40$^{4x'}$. The first and second rotating members 22$^{4x'}$, 36$^{4x'}$ are guided for rotational movement relative to each other and around the first axis 26 by a pair of bearings 30$^{4x'}$ and 44$^{4x'}$ at axially spaced locations. Retaining members 48$^{4x'}$ and 50$^{4x'}$ maintain the axial positions of the bearings 30$^{4x'}$ and 44$^{4x'}$, respectively.

While in the prior embodiments, a different configuration of bearing is shown, in this embodiment, a ball bearing 30$^{4x'}$ is used. The ball bearing construction is not required as a dry metal bearing, as previously described, might be utilized in its stead.

A coil spring 54$^{4x'}$ is mounted within a spring containing chamber 52$^{4x'}$ and is in the form of a spirally wound linear member made, as with each spring embodiment herein, from an appropriate metal material, known to those skilled in the art. The coils 56$^{4x'}$ on the spring 54$^{4x'}$ may have the same radius continuously between the axial ends 60$^{4x'}$ and 62$^{4x'}$ thereof. Alternatively, the diameters of the coils 56$^{4x'}$ can vary between the ends and center thereof.

The first rotating member 22$^{4x'}$ has an axially opening recess 64$^{4x'}$ bounded by a radially outwardly facing surface 112 and a radially inwardly facing surface 114 spaced radially a distance approximately equal to the radial cross-sectional dimension of the spring turns 56$^{4x'}$ residing in the recess 64$^{4x'}$ therebetween. The axially opening recess 64$^{4x'}$ is bounded by an axially facing surface 66$^{4x'}$. The coil spring 54$^{4x'}$ is configured so that it is brought into contact with the radially outwardly facing surface 112. The axially facing surface 66$^{4x'}$, as seen in FIG. 7, extends only part way around the axis 26, thereby defining a circumferentially facing stop surface 116 that is abuttable to the free end 118 of the coil spring 54$^{4x'}$.

With the spring end 60$^{4x'}$ in the axially opening recess 64$^{4x'}$, the end coil 56$^{4x'}$ extends into an arcuate portion 120 of the axially opening recess 64$^{4x'}$ that defines the axially facing surface 66$^{4x'}$, as shown in FIG. 7. This coil 56$^{4x'}$, and an adjacent coil, define a mounting portion of the coil spring 54$^{4x'}$ that frictionally engages the radially outwardly facing surface 112.

The arcuate portion 120, and thus the axially facing surface 66$^{4x'}$, extends through an angle (θ) of approximately 90°, though this is not a requirement. For example, as shown in FIG. 7, the region at 124, that is not axially recessed and indicated by the angle θ, is on the order of 90°.

The free end 118 of the coil spring 54$^{4x'}$ needs to be sufficiently strong to support the coil spring 54$^{4x'}$ in a manner that it will transmit rotational forces in operation. The free end 118 and stop surface 16 also cooperate so that the coil spring 54$^{4x'}$ does not incline relative to the axis 26 in its operative orientation.

While it is preferred that the angle θ be as small as possible, it is also necessary that the arcuate portion 120 have an axial depth equal to at least the axial dimension of the coil 56$^{4x'}$ therewithin, at least at, or adjacent to, the region at which the stop surface 116 and free end 118 of the coil spring 54$^{4x'}$ interact.

The radial dimension R2 of the axially opening recess 64$^{4x'}$ is not critical to the present invention. It is only required that the dimension R2 be sufficient to accommodate the corresponding radial dimension R3 of the individual coil turns 56$^{4x'}$ that reside therewithin.

The spring end 62$^{4x'}$ may be operatively engaged in substantially the same manner within an axially opening recess 126. The recess 126 opens axially oppositely to the recess 64$^{4x'}$. The spring end 62$^{4x'}$ may be fixed with respect to the second rotating member 36$^{4x'}$ by locking an end portion thereof that is offset either radially inwardly or outwardly within a cooperating receptacle and press fitting the spring end 62$^{4x'}$ into the axially opening recess 126 between the radially inwardly and outwardly facing surfaces 128, 130 bounding the same. Preferably, however, the connection between the spring end 62$^{4x'}$ and rotating member 36$^{4x'}$ is maintained entirely by radial, frictional holding forces.

Through the above described arrangement, the coil spring 54$^{4x'}$ is arranged within the spring containing chamber 52$^{4x'}$ concentrically with the first and second rotating members 22$^{4x'}$, 36$^{4x'}$ around the axis 26. The first and second rotating members 22$^{4x'}$, 36$^{4x'}$ are thus elastically interconnected through the coil spring 54$^{4x'}$.

The coil spring 54$^{4x'}$ is mounted with respect to the radially outwardly facing surface 112 so that when the first rotating member 22$^{4x'}$ is moving at a rotational speed equal to or greater than that of the second rotating member 36$^{4x'}$ in a direction tending to tighten/constrict the diameter of the coil spring 54$^{4x'}$, as indicated by the arrow T in FIG. 8, the surface 112 and inside surface 81$^{4x'}$ of the spring end 60$^{4x'}$ are engaged and frictionally held against relative movement around the axis 26.

When the first rotating member 22$^{4x'}$ is rotated at a speed less than that of the second rotating member 36$^{4x'}$ in a direction indicated by the arrow L in FIG. 8, tending to loosen/expand the diameter of the coil spring 54$^{4x'}$, the spring end 60$^{4x'}$ is allowed to rotate freely relative to the first rotating member 22$^{4x'}$. As this occurs the stop surface 116 eventually bears against the free end 118 of the coil spring 54$^{4x'}$ in the direction of the arrow A, thereby tending to relax the spring 54$^{4x'}$ so that it increases in diameter.

To allow this operation, the inner diameter of the coils 56$^{4x'}$ is controllably selected and set with the coil spring 54$^{4x'}$ removed from the spring containing chamber 52$^{4x'}$. Alternatively, a fluid can be selected with a viscosity that causes the desired adhesion between the inside surfaces 81$^{4x'}$ of the coils 56$^{4x'}$ on the coil spring 54$^{4x'}$ and the radially outwardly facing surface 112, where these surfaces interact.

The operation of the pulley structure 10$^{4x'}$ in FIGS. 6-8 will now be described. As the first rotating member 22$^{4x'}$ begins to rotate in the direction of the arrow T, around the axis 26 under a force applied as through the aforementioned belt 20, with the first and second rotating members 22$^{4x'}$, 36$^{4x'}$ initially at rest, the rotational speed of the first rotating member 22$^{4x'}$ in the direction of the arrow T is greater than that of the second rotating member 36$^{4x'}$. In this state, the spring end 60$^{4x'}$ is frictionally held relative to the radially outwardly facing surface 112 on the first rotating member 22$^{4x'}$ to follow rotational movement thereof in the direction of the arrow T. As rotation continues in this manner, with the spring end 62$^{4x'}$ fixed with respect to the second rotating member 36$^{4x'}$, the rotational forces from the first rotating member 22$^{4x'}$ are elastically transmitted to the second rotating member 36$^{4x'}$ through the coil spring $54^{4x'}$. At startup, this elastic force transmission causes the second rotating member $36^{4x'}$ to rotate in the same direction as the first rotating member $22^{4x'}$. As rotation of the first member $22^{4x'}$ continues, the coil spring $54^{4x'}$ tightens with respect to the radially outwardly facing surface 112 to the point that the first and second rotating members $22^{4x'}$, $36^{4x'}$ eventually rotate in the direction of the arrow T at the same rotational speed. The first end $60^{4x'}$ of the coil spring $54^{4x'}$ becomes frictionally held to the first rotating member $22^{4x'}$ so that there is no relative movement therebetween around the axis 26.

Additionally, as the rotational speed of the first rotating member $22^{4x'}$ increases, the radial gripping force of the inside surfaces $81^{4x'}$ of the coils $56^{4x'}$ on the coil spring $54^{4x'}$ against the surface 112 increases. Thus, even as rotational speed of the first rotating member $22^{4x'}$ increases significantly, the holding force between the coil spring $54^{4x'}$ and surface 112 increases to avoid slippage.

In the event that the rotational speed of the first rotating member $22^{4x'}$ in the direction of the arrow T becomes equal to or greater than that of the second rotating member $36^{4x'}$, because the middle region of the coil spring $54^{4x'}$ between the ends $60^{4x'}$, $62^{4x'}$ is wound more tightly than at startup, there is a residual elastic rotational force tending to relax the spring $54^{4x'}$ to a loosened/expanded diameter, as a result of which the first and second rotating members $22^{4x'}$, $36^{4x'}$ are allowed to instantaneously elastically rotate relative to each other around the axis 26.

In the event that the speed of the belt 20 is rapidly reduced, as by changing the speed of the engine drive shaft 18, a rotative force in the direction of the arrow L is induced to the second rotating member $36^{4x'}$, tending to relax the state of the coil spring $54^{4x'}$. As noted above, the first and second rotating members $22^{4x'}$, $36^{4x'}$ are allowed to instantaneously elastically rotate relative to each other due to the elastic nature of the coil spring $54^{4x'}$. Thus, in the event that the speed of the belt 20 is rapidly reduced, the first rotating member $22^{4x'}$ can be rotated in the direction of the arrow L relative to the second rotating member $36^{4x'}$ through inertial forces. At this point, the stop surface 116 engages the spring free end 118 by moving in the direction of the arrow A so that the coil spring $54^{4x'}$ is relaxed without slippage occurring between the coil spring $54^{4x'}$ and the first rotating member $22^{4x'}$.

In this situation, the spring end $60^{4x'}$ shifts circumferentially approximately 5° relative to the surface 112. As a result, belt squeak can be avoided and belt wear minimized by gradually absorbing the forces due to variation in the rotational speed of the engine drive shaft 18.

With the above described embodiment, the coil spring $54^{4x'}$ is functional to accommodate changes in system state between one wherein the first and second rotating members $22^{4x'}$, $36^{4x'}$ are moving at the same rotational speed and one wherein the first rotating member $22^{4x'}$ is rotated at a speed less than that of the second rotating member $36^{4x'}$ in the same direction.

Further, the connection between the coil spring end $60^{4x'}$ and the first rotating member $22^{4x'}$ avoids potentially damaging stress concentrations that might lead to system failure with connections as commonly used in the prior art, as earlier described and having offset ends that fix the location of the spring end. In the above embodiment, the spring end $60^{4x'}$ is maintained in the arcuate portion 120 of the axially opening recess $64^{4x'}$. The spring end $60^{4x'}$ is fixed by reason of frictional interaction between radially facing surfaces that confine relative rotational movement with respect to the axis 26. No sharp bends are required in the coil spring 54 as might produce localized stresses. Torque variations are absorbed instead over significant lengths of radially facing surfaces.

Additionally, by using a coil spring mounted in a spiral shape, the permitted amount of angular displacement can be made generally larger than is possible with a rubber component in a ring-like shape, or the like. Thus, the relative angular displacement between the first and second rotating members $22^{4x'}$, $36^{4x'}$ can occur over a relatively large range to effectively absorb forces encountered during speed variations in operation.

Further, the inventive structure permits the first rotating member $22^{4x'}$ to be made of a material that is light in weight or made with weight reducing cutouts. The rotational moment of inertia for the rotating member $22^{4x'}$ can be made relatively low. Thus, tension on the belt 20 need not be high to maintain the first rotational member $22^{4x'}$ at a desired rotational speed. Operating forces exceeding a static friction force on the first rotating member $22^{4x'}$ and belt 20 can be avoided, thereby potentially avoiding slippage and prolonging the useful life of the belt, without appreciable wear.

It is preferable to use a lighter material, such as a light aluminum alloy to make the first rotating member $22^{4x'}$, as well as the corresponding first rotating member, in other embodiments herein. This allows a further reduction in the rotational moment of inertia, potentially even further prolonging the serviceable life of the belt.

The invention contemplates, with this and the other embodiments herein, that the cross-sectional shape of the coils on the coil springs may be changed. It is known, for example, that under the same relative angular displacement, with the same coil/turn number, and the same spring constant, a maximum tensile/compressive stress generated in a rectangular shape can be reduced to about 70% over a square shape. On the other hand, the required number of turns/coils for the rectangular shape is 70% less than for square under the same maximum tensile/compressive stress generated for the same relative angular displacement and with the same spring constant. Although the squared coil spring shape may be preferred for the above reasons, the invention is not limited thereto. Other cross-sectional shapes, such as circular, are contemplated.

Use of the coil spring end $60^{4x'}$, as described, permits firm, straight and stable installation without likelihood of inadvertent inclination relative to the axis 26. If a coil spring, as described, is inclined, or has a tendency to become inclined, large forces exerted on the coil spring, due to variation in rotation applied through the first rotating member $22^{4x'}$, may cause destruction of the coil spring $54^{4x'}$. The above-described cooperation between the axially opening recess $64^{4x'}$ and coil spring end $60^{4x'}$ avoids skewing. As a result, variation in rotation between the first and second rotating members $22^{4x'}$, $36^{4x'}$ can be absorbed over a substantial length of the coil spring $54^{4x'}$, thereby potentially extending its useful life.

While the invention is useable as described for a system wherein a force is exerted from the drive shaft 18 through the belt 20 to the first rotating member $22^{4x'}$ and then through the coil spring $54^{4x'}$ to the second rotating member $36^{4x'}$, there are environments wherein a force is exerted upon the second rotating member $36^{4x'}$, which transmits this rotational force through the coil spring $54^{4x'}$ to the first rotating member $22^{4x'}$. The inventive structure is functional in both modes effectively.

When the second rotating member $36^{4x'}$ is rotated at a speed equal to or greater than that of the first rotating member $22^{4x'}$ in the direction of the arrow L in FIG. 8, tending to tighten/reduce the diameter of the coil spring $54^{4x'}$, the spring end $60^{4x'}$ cooperates with the surface 112 to frictionally hold the same. In a situation where the second rotating member $36^{4x'}$ is rotated at a rotational speed less than that of the first rotational member $22^{4x'}$ in the direction of the arrow L, that tends to reduce the diameter of the coil spring $54^{4x'}$ to increase its holding force, the inside spring surface $81^{4x'}$ is permitted to move circumferentially substantially freely relative to the surface 112 by reason of the driving interaction of the stop surface 116 and spring free end 118, thereby driving the coil spring end $60^{4x'}$ in a direction indicated by the arrow A that tends to relax the coil spring $54^{4x'}$.

While the spring end $60^{4x'}$ is described to frictionally cooperate with the surface 112 on the first rotating member $22^{4x'}$, and the other spring end $62^{4x'}$ is fixed to the second rotating member $36^{4x'}$, the mounting structures may be reversed at the coil spring ends. That is, the coil spring end $62^{4x'}$ may be frictionally engaged with the second rotating member $36^{4x'}$ with the first coil spring end $60^{4x'}$ fixed to the first rotating member $22^{4x'}$. More preferably, both spring ends $60^{4x'}$, $62^{4x'}$ are held to their respective members $22^{4x'}$, $36^{4x'}$ through only radial frictional forces, so that no separate fasteners are required at either spring end $60^{4x'}$, $62^{4x'}$ and stress concentration due to localized bending, as at an offset end, can be avoided.

Further, when the speed of one of the first rotating member $22^{4x'}$ and second rotating member $36^{4x'}$ in a direction tending to tighten the coil spring $54^{4x'}$ is less than that of the other, it is preferred, as shown, to provide a portion of the coil spring $54^{4x'}$ between its ends that is not brought into contact with either of the first or second rotating members $22^{4x'}$, $36^{4x'}$. Accordingly, in transition between a state wherein both of the first and second rotating members $22^{4x'}$, $36^{4x'}$ are moving at the same rotational speed and a state wherein rotative forces between one traveling at a lesser rotational speed than the other are transmitted, the coil spring $54^{4x'}$ absorbs rotational forces and thereby avoids abrupt change in rotational speed of either rotating member $22^{4x'}$, $36^{4x'}$, therefore potentially lengthening the useful life of the system components.

As earlier noted, while the various pulley systems to this point have been described in association with an alternator 12 on an automobile engine 14, the invention might be utilized in virtually an unlimited number of different environments, such as, for example, a compressor shaft of an air conditioner on an automobile. Further, the applications are not limited to the automotive or vehicular environment, and the pulley structures might be used on virtually any rotation transmitting systems in any environments.

A further modified form of pulley structure is shown at $10^{5x'}$ in FIGS. 9-15. As seen initially in FIG. 9, the pulley structure $10^{5x'}$ has first and second rotating members $22^{5x'}$, $36^{5x'}$ guided for relative movement by bearings $30^{5x'}$, $44^{5x'}$ acting therebetween. The coil spring $54^{5x'}$ resides in a spring containing chamber $52^{5x'}$, with the spring ends $60^{5x'}$, $62^{5x'}$ respectively residing in axially opening recesses $64^{5x'}$, $82^{5x'}$, respectively on the first and second rotating members $22^{5x'}$, $36^{5x'}$.

The first rotating member $22^{5x'}$ has a radially outwardly facing surface $112^{5x'}$ that frictionally cooperates with at least one, and potentially a plurality of coils $56^{5x'}$ on the coil spring $54^{5x'}$. The axial dimension of the axially opening recess $64^{5x'}$ is sufficient to accommodate one or more coils $56^{5x'}$ on the attaching region of the spring $54^{5x'}$ that cooperate with the surface $112^{5x'}$. By having multiple coils/turns $56^{5x'}$ cooperate with the surface $112^{5x'}$, a frictional holding force between the coil spring end $60^{5x'}$ and surface $112^{5x'}$ on the first rotating member $22^{5x'}$ can be increased, thereby making slippage between the coil spring end $60^{5x'}$ and first rotating member $22^{5x'}$ less likely.

The inside surface $81^{5x'}$ on the spring $54^{5x'}$ has a diameter D2 that is less than the diameter D3 of the surface $112^{5x'}$. With the coil spring $54^{5x'}$ in its operative position, residual elastic forces radially bias the coils $56^{5x'}$ so that the surface $81^{5x'}$ is frictionally held against the surface $112^{5x'}$. These radial holding forces are shown schematically and identified by the arrows X in FIG. 12 and avoid slippage between the coil spring $54^{5x'}$ and surface $112^{5x'}$.

The opposite coil spring end $62^{5x'}$ is connected to the second rotating member $36^{5x'}$ within the axially opening recess $82^{5x'}$. In this embodiment, the coil spring $54^{5x'}$ has the same radius fully between the coil ends $60^{5x'}$, $62^{5x'}$.

Figure 13:
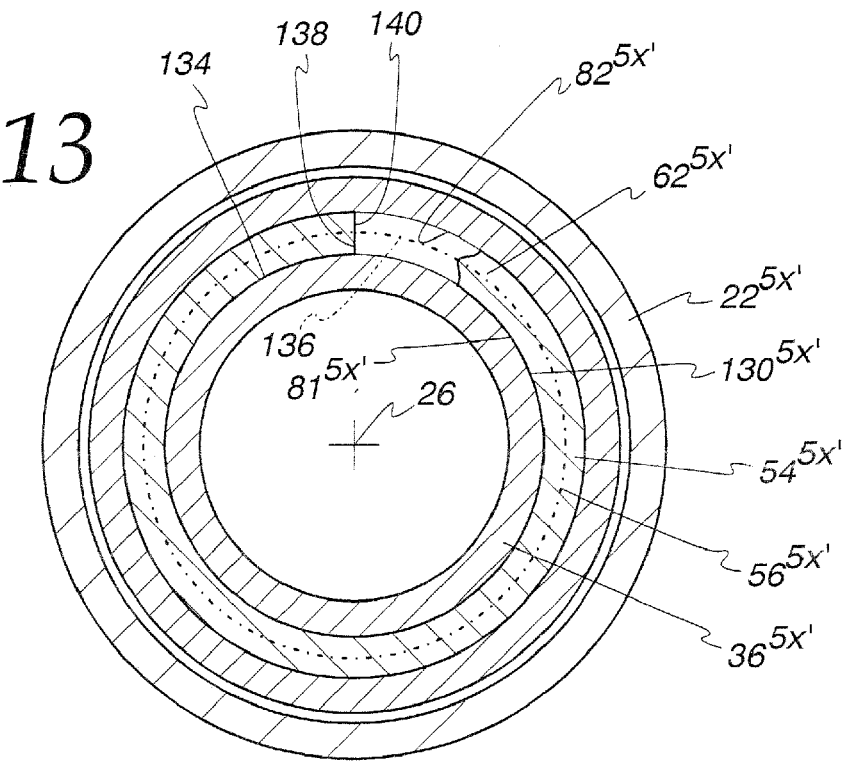
FIG. 13 is a cross-sectional view of the pulley structure taken along lines 13-13 of FIG. 9.

The second rotating member $36^{5x'}$ has a radially outwardly facing surface $130^{5x'}$ that cooperates with the inside surface $81^{5x'}$ on the coil spring $54^{5x'}$. The axially opening recess $82^{5x'}$ has an arcuate portion 134. An axially facing surface 136 bounding the axially opening recess $82^{5x'}$ extends through the arcuate portion 134, thereby producing a circumferentially facing stop surface 138 capable of abutting to a free end 140 of the coil spring $54^{5x'}$, as shown in FIG. 13. This connection of the second coil spring end $62^{5x'}$ avoids fatigue rupture associated with a bent fixing end. As noted above, the bent ends produce stress concentrations that tend to fatigue after repeated force application in use.

The connection between the second spring end $62^{5x'}$ and the axially opening recess $82^{5x'}$ is similar to that for the coil spring end $60^{5x'}$ within the axially opening recess $64^{5x'}$. That is, the axially opening recess $82^{5x'}$ has an axial dimension to accept one, and potentially more than one, coil/turn of the coil spring $54^{5x'}$, that interact with the radially outwardly facing surface $130^{5x'}$ on the second rotating member $36^{5x'}$.

The inside spring surface $81^{5x'}$ has a relaxed diameter that is less than the diameter of the radially outwardly facing surface $130^{5x'}$. Thus, by placing the coil spring end $60^{5x'}$ in the operative position within the axially opening recess $82^{5x'}$, the inside surface $81^{5x'}$ is increased in diameter to a loading diameter wherein a residual elastic force radially biases coils $56^{5x'}$ at an attaching region to be frictionally held to the surface $130^{5x'}$.

With the disclosed construction, the spring containing chamber $52^{5x'}$ has a portion 144 radially outside of the coil spring $54^{5x'}$ and a portion 146 radially inside of the coil spring $54^{5x'}$ which accommodate deformation of coils $56^{5x'}$ between the coil spring ends $60^{5x'}$, $62^{5x'}$, in both radially inward and radially outward directions, that respectively decreases and increases the coil diameters.

Figure 12:
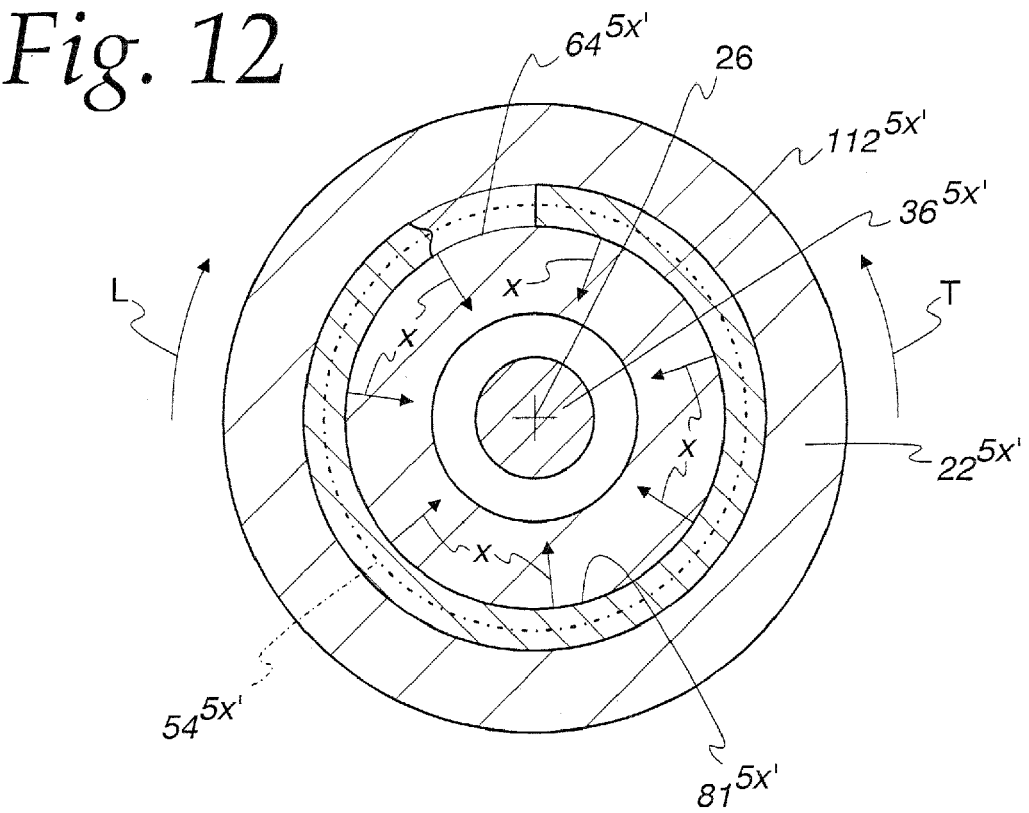
FIG. 12 is a cross-sectional view of the pulley structure taken along line 12-12 of FIG. 9.

In the event that the rotational speed of the first rotating member $22^{5x'}$, in the direction of the arrow T in FIG. 12 and tending to tighten the coil spring $54^{5x'}$ by reducing its diameter, is less than that of the second rotating member $36^{5x'}$, or the first rotating member $22^{5x'}$ is rotated in the direction of the arrow L, relative to the first rotating member $22^{5x'}$, tending to relax the coil spring $54^{5x'}$, the diameter of the coil spring $54^{5x'}$ tends to increase between the ends $60^{5x'}$, $62^{5x'}$ from the dotted line shape as shown in FIG. 14. The portion 144 of the spring containing chamber $52^{5x'}$ accommodates this spring diameter increase. That is, the coils between the spring ends $60^{5x'}$, $62^{5x'}$ are allowed to increase in diameter without contacting any portion of the first or second rotating members $22^{5x'}$, $36^{5x'}$. Thus, in transition between a state wherein the first and second rotating members $22^{5x'}$, $36^{5x'}$ are rotated at the same rotational speed and a state wherein the first rotating member $22^{5x'}$ is operating at a rotational speed less than that of the second rotating member $36^{5x'}$, the coil spring $54^{5x'}$ deforms and thereby absorbs forces resulting from an abrupt change in relative rotational speeds of the rotating members $22^{5x'}$, $36^{5x'}$. This reduces forces on the first and second members $22^{5x'}$, $36^{5x'}$ that might tend to damage or destroy the first and/or second rotating members $22^{5x'}$, $36^{5x'}$.

In the situation where the rotational speed of the first rotating member $22^{5x'}$ in the direction T tending to tighten the coil spring $54^{5x'}$ is equal to or greater than the rotational speed of the second rotating member $36^{5x'}$, the region of the coil spring $54^{5x'}$ between its end $60^{5x'}$, $62^{5x'}$ is contracted from the dotted line shape into the region 146, as shown in FIG. 15. There is thus a residual force within the coil spring $54^{5x'}$ between its ends $60^{5x'}$, $62^{5x'}$, tending to relax the coils. This allows the first and second rotating members $22^{5x'}$, $36^{5x'}$ to instantaneously elastically rotate relative to each other.

As with the prior embodiment, while the rotational force of the first rotating member $22^{5x'}$ may be transmitted to the second rotating member $36^{5x'}$ as initiated by, for example, an engine drive shaft 18, there may be situations in which rotational forces may be imparted from the second rotating member $36^{5x'}$ to the first rotating member $22^{5x'}$. In this case, the drive force is transmitted from the second rotating member $36^{5x'}$ through the coil spring $54^{5x'}$ to the first rotating member $22^{5x'}$ for output via the belt 20.

Figure 16:
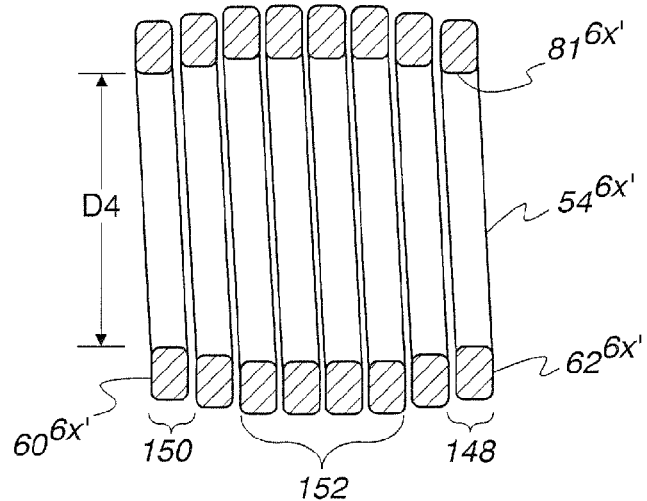
FIG. 16 is a cross-sectional view of a modified form of coil spring for transmitting forces between two relatively rotatable members.
Figure 17:
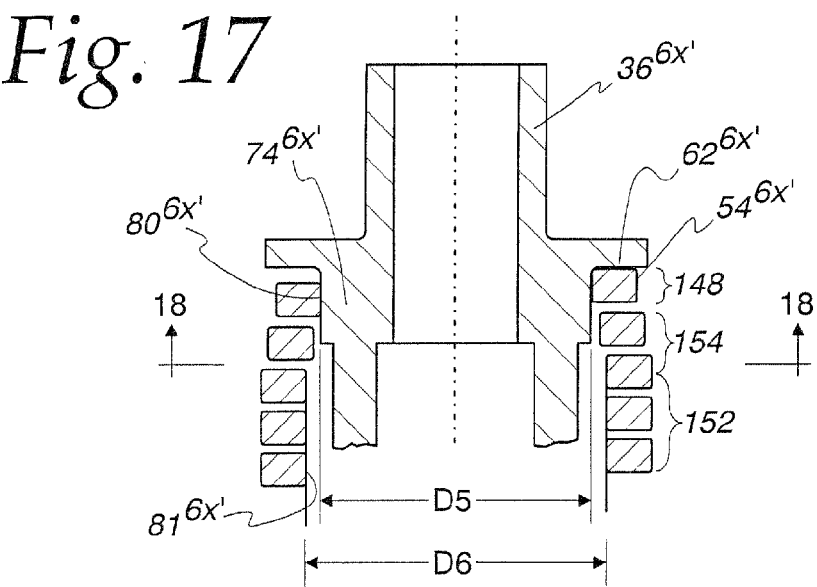
FIG. 17 is a cross-sectional view of a rotating member connected to an end of the coil spring in FIG. 16.
Figure 18:
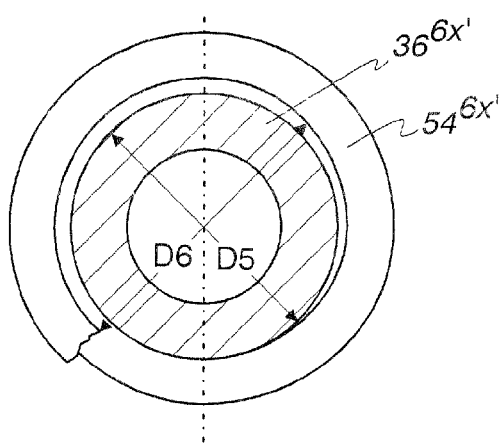
FIG. 18 is a cross-sectional view of the spring end rotating member taken along lines 18-18 of FIG. 17.
Figure 19:
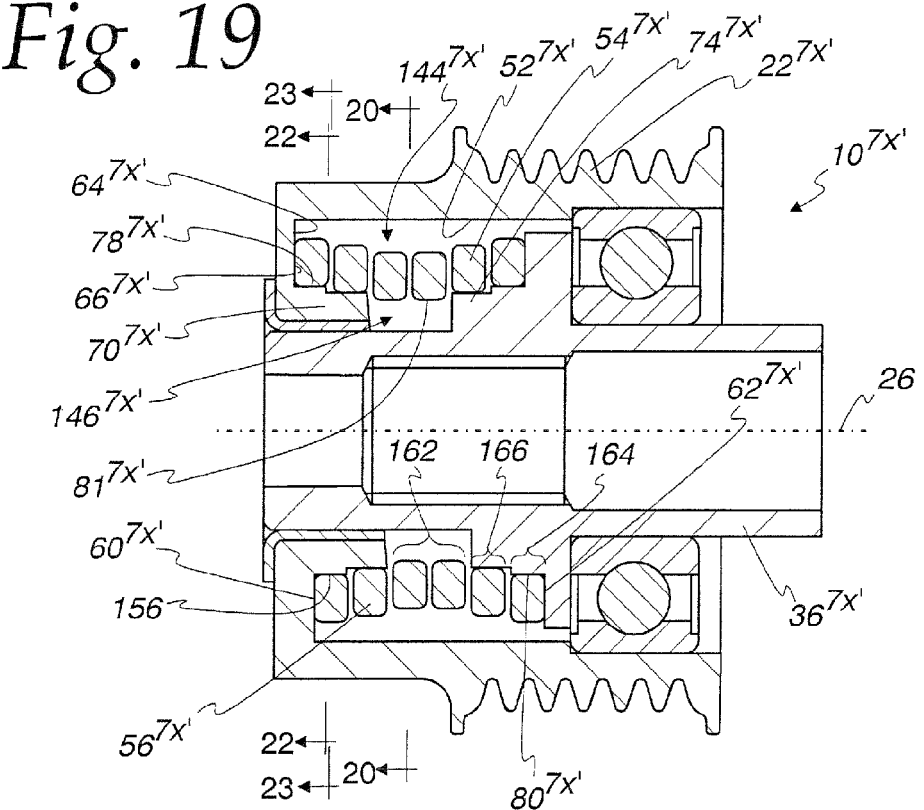
FIG. 19 is a cross-sectional view of a further modified form of pulley structure.

In FIGS. 16-18, a further modified form of spring $54^{6x'}$ is shown. More specifically, the connection between one spring end $62^{6x'}$ and a second rotating member $36^{6x'}$ is shown and is representative of the connection between the other spring end $60^{6x'}$ to a first rotating member (not shown).

The coil spring $54^{6x'}$ consists of end attaching regions 148, 150, a central region 152, and transition regions (one shown at 154 between the central region 152 and end attaching region 148). The opposite transition region between the central region 152 and end attaching region 150 is similar to the transition region 154 between the end region 148 and central region 152, and will not be described herein.

The relaxed diameters D4 of the end attaching regions 148, 150 are less than the diameter D5 of the radially outwardly facing surface $80^{6x'}$ on a spring holding portion $74^{6x'}$ on the second rotating member $36^{6x'}$. The diameter D4 is also less than the diameter D6 of the inside surface $81^{6x'}$ at the central region 152. At the exemplary transition region 154, the diameter of the inside surface $81^{6x'}$ increases from the diameter D5 to the diameter D6, moving from the end attaching region 148 towards the central region 152. The inside surface $81^{6x'}$ is thus spaced from the radially outwardly facing surface $80^{6x'}$ at the transition region 154.

In a structure wherein there is an axially localized contact between the inside surface of a spring and a cooperating, radially outwardly facing surface, there is concern of generating a stress concentration at that region each time there is a significant variation in rotation between the rotating members. This may account for wear, damage, or complete destruction of the coil spring. By incorporating the transition regions 154, whereat the inside surface $81^{6x'}$ does not contact the radially outwardly facing surface $80^{6x'}$, this localized contact can be avoided. Thus, wear, damage, and potentially destruction, of the spring $54^{6x'}$ at the transition region 154 may be avoided.

The construction of the coil spring $54^{6x'}$ is generally not complicated by making the turns with different diameters at the end attaching regions 148, 150, central region 152, and transition regions 154. Thus, the aforementioned advantages can be realized without significantly increasing the expense of manufacturing the coil spring $54^{6x'}$.

Further, the frictional holding forces between the spring end $62^{6x'}$ and radially outwardly facing surface $80^{6x'}$ on the second rotating member $36^{6x'}$ can be increased by reason of the depicted construction. The coil spring $54^{6x'}$ is thus less likely to slip relative to the second rotating member $36^{6x'}$. This promotes predictable operation as well as avoiding the aforementioned wear or destruction of the spring $64^{6x'}$ near its ends $60^{6x'}$, $62^{6x'}$.

While the diameters of the inside surface $81^{6x'}$ at the end attaching regions 148, 150 have been described to be the same, this is not a requirement. Further, while the radially outwardly facing surface $80^{6x'}$ cooperating with the one spring end $62^{6x'}$ and that (not shown) cooperating with the inside surface $81^{6x'}$ at the other spring end $62^{6x'}$ are the same in this embodiment, this is not a requirement. It is desired, however, that the relationship of the regions 148-154, described above, be maintained.

Further, while a single turn is shown at each transition region 154, each transition region 154 may consist of multiple coils/turns.

A further form of pulley structure is shown at $10^{7x'}$ in FIGS. 19-23. The pulley structure consists of a first rotating member $22^{7x'}$ and a second rotating member $36^{7x'}$ that are relatively rotatable about the axis 26. A coil spring $54^{7x'}$ resides within a spring containing chamber $52^{7x'}$. The coil spring $54^{7x'}$ has axially spaced ends $60^{7x'}$, $62^{7x'}$, respectively engaged with the first and second rotating members $22^{7x'}$, $36^{7x'}$. The coil spring $54^{7x'}$ has a substantially uniform diameter between the ends $60^{7x'}$ and $62^{7x'}$. The spring ends $60^{7x'}$, $62^{7x'}$ cooperate with spring holding portions $70^{7x'}$, $74^{7x'}$ on the first and second rotating members $22^{7x'}$, $36^{7x'}$, respectively. At each end of the coil spring $54^{7x'}$, at least one, and as depicted more than one, coil/turn $56^{7x'}$ engages a spring holding portion $70^{7x'}$ and $74^{7x'}$.

The spring containing chamber $52^{7x'}$ has a portion $144^{7x'}$ radially outside of the coil spring $54^{7x'}$, and a portion $146^{7x'}$ radially inside of the coil spring $54^{7x'}$ between the spring ends $60^{7x'}$, $62^{7x'}$.

The spring holding portion $70^{7x'}$ has a radially outwardly facing surface $78^{7x'}$ that engages the inside surface $81^{7x'}$ of the coil spring $54^{7x'}$ at the spring end $60^{7x'}$. The spring holding portion $74^{7x'}$ has a like, radially outwardly facing surface $80^{7x'}$ that engages the inside surface $81^{7x'}$ of the coil spring $54^{7x'}$ at the coil end $62^{7x'}$.

Figure 20:
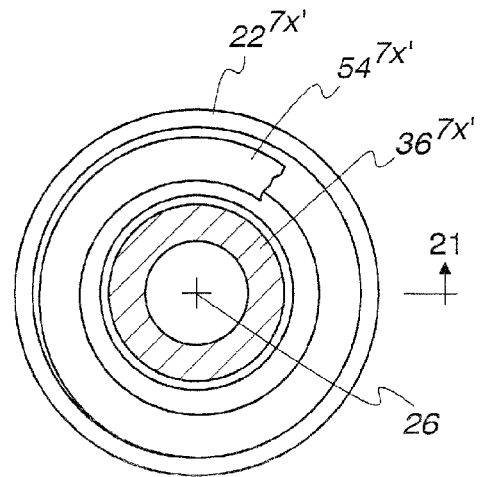
FIG. 20 is a reduced, cross-sectional view of the pulley structure taken along lines 20-20 of FIG. 19.
Figure 21:
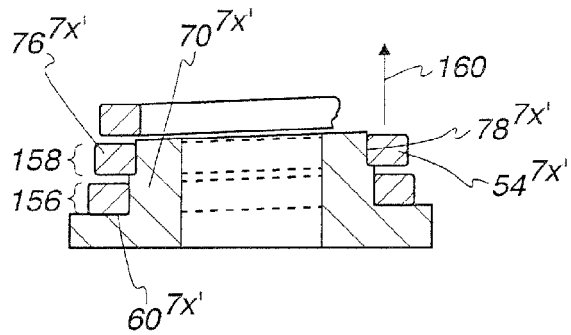
FIG. 21 is a reduced, cross-sectional view of the pulley structure taken along lines 21-21 of FIG. 20.

Referring to FIGS. 20 and 21, the connection of the coil spring $54^{7x'}$ to the spring holding portion $70^{7x'}$ is depicted, with it being understood that the connection between the other spring end $62^{7x'}$ and spring holding portion $74^{7x'}$ may be similar in structure.

The radially outwardly facing surface $78^{7x'}$ on the spring holding portion $70^{7x'}$ has a continuous spiral shape. The surface $78^{7x'}$ has a constant diameter region 156 to which the end coil $56^{7x'}$ of the mounting portion at the spring end $60^{7x'}$ attaches. The diameter of the surface $78^{7x'}$ decreases at a transition region 158 that is contiguous with the region 156, with the diameter decreasing in the axial direction identified by the arrow 160. The middle region 162 of the coil spring $54^{7x'}$ between the ends $60^{7x'}$, $62^{7x'}$ does not engage either of the rotating members $22^{7x'}$, $36^{7x'}$.

With the coil spring $54^{7x'}$ separated and having its relaxed diameter, the diameter of the inside surface $81^{7x'}$ at both the regions 156, 158 is less than the diameter of the surface $78^{7x'}$ where these regions coincide. The inside surface $81^{7x'}$ of the coils/turns $56^{7x'}$ spirally conform to the surface $78^{7x'}$ so that there is no gap between the surfaces $81^{7x'}$, $78^{7x'}$. The pitches of the surfaces $78^{7x'}$ and $81^{7x'}$ are matched so that the surfaces $78^{7x'}$ and $81^{7x'}$ are frictionally gripped along preferably the entire axial extent of the surface $78^{7x'}$.

The same type of connection is contemplated between the other spring end $62^{7x'}$ and the spring holding portion $74^{7x'}$.

Figure 22:
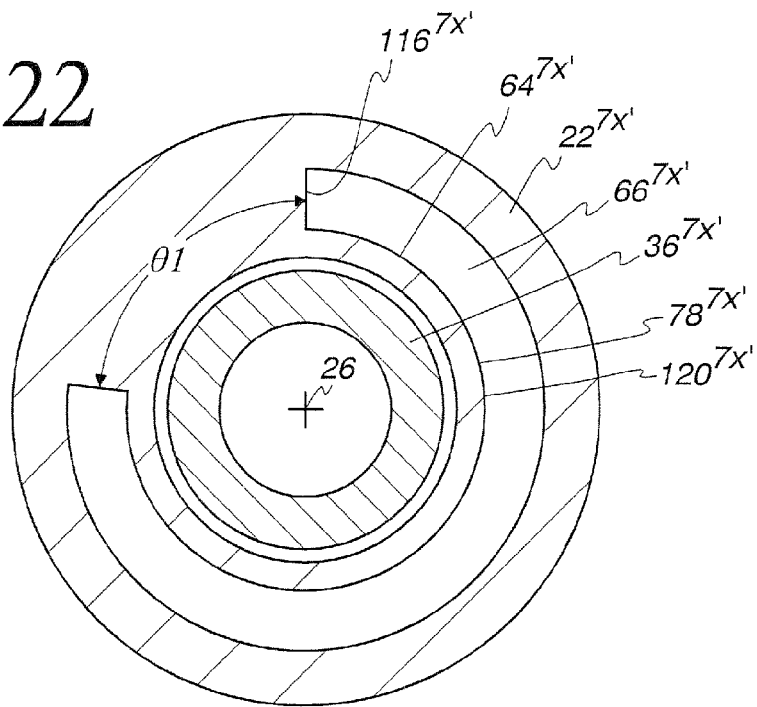
FIG. 22 is a cross-sectional view of the pulley structure taken along lines 22-22 of FIG. 19.
Figure 23:
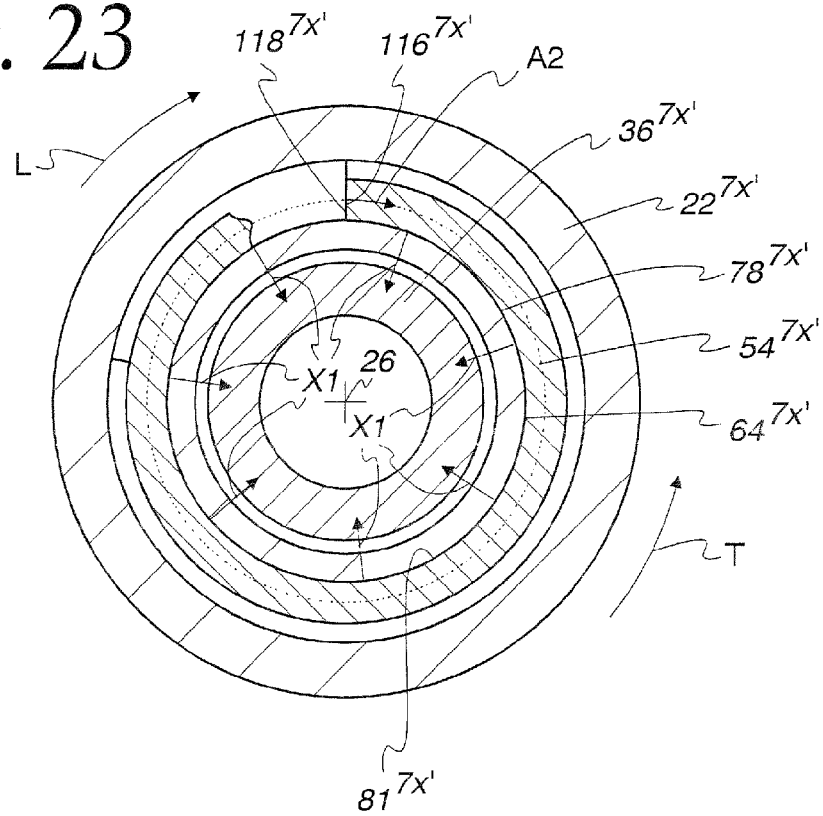
FIG. 23 is a cross-sectional view of the pulley structure taken along lines 23-23 of FIG. 19.

As seen additionally in FIGS. 22 and 23, the first rotating member $22^{7x'}$ has a stop surface $116^{7x'}$ facing in a circumferential direction. The stop surface $116^{7x'}$ is designed to abut to a free end $118^{7x'}$ of the coil spring $54^{7x'}$. A like arrangement is provided on the opposite spring end $62^{7x'}$ for connection with the second rotating member $36^{7x'}$. From the spring end $118^{7x'}$, the spring $54^{7x'}$ wraps around the surface $78^{7x'}$. As noted above, the same arrangement exists at the other spring end $62^{7x'}$.

As seen in FIG. 22, the axially opening recess $64^{7x'}$ has an arcuate portion $120^{7x'}$ formed within the first rotating member $22^{7x'}$ in which the axially facing surface $66^{7x'}$ is defined. The arcuate portion $120^{7x'}$ extends around the axis 26 through all but a region identified by $\theta 1$, that is on the order of 90°. However, the angle $\theta 1$ is not limited to this. It is preferable to make the angle $\theta 1$ as small as possible so that the coil spring $54^{7x'}$ is stably brought into contact with the surface $78^{7x'}$.

It is also preferred that the area of the surface $116^{7x'}$ be equal to or larger than the area at the free end $118^{7x'}$ of the coil spring $54^{7x'}$ so that the surface $116^{7x'}$ can drive the free end $118^{7x'}$ positively in rotation.

As seen in FIG. 23, in the event that the first rotating member $22^{7x'}$ is rotated in a direction indicated by the arrow T around the axis 26 at a rotational speed equal to or greater than that of the second rotating member $36^{7x'}$, the inside surface $81^{7x'}$ is frictionally held against the surface $78^{7x'}$ to follow movement thereof. In a situation where the first rotating member $22^{7x'}$ is rotated in a direction tending to tighten the coil spring $54^{7x'}$, at a speed less than that of the speed of the second rotating member $36^{7x'}$, the surface $78^{7x'}$ rotates in the direction of the arrow L relative to the first spring region 156 by about 5°, whereupon the surface $78^{7x'}$ becomes fixed relative to the region 156 as the stop surface $116^{7x'}$ bears upon the free end $118^{7x'}$, thereby relaxing the coil spring $54^{7x'}$.

The connection between the coil spring end $62^{7x'}$ and the spring holding portion $74^{7x'}$ is similar. The coil spring $54^{7x'}$ at the spring end $62^{7x'}$ has regions 164, 166 corresponding to the regions 156, 158 that cooperate with a spirally-shaped radially outwardly facing surface $80^{7x'}$ on the spring holding portion $74^{7x'}$.

When the first rotating member $22^{7x'}$ is rotated in a winding direction, tending to tighten the coil spring $54^{7x'}$, at a rotational speed equal to or greater than that of the second rotating member $36^{7x'}$, the inside surface $81^{7x'}$ at the spring end $62^{7x'}$ is fixed with respect to the surface $80^{7x'}$ by reason of frictional gripping at the region 164. In the event that the first rotating member $22^{7x'}$ is rotated in a direction, tending to tighten the coil spring $54^{7x'}$, at a rotational speed less than that of the second rotating member $36^{7x'}$, the inside surface $81^{7x'}$ shifts angularly relative to the surface $80^{7x'}$ on the order of about 5°. Thereafter, the inside surface $81^{7x'}$ at the spring end $62^{7x'}$ is frictionally fixed relative to the surface $80^{7x'}$ with the free end of the coil spring being engaged and circumferentially moved by a stop surface (not shown) in a direction of winding tending to relax the coil spring $54^{7x'}$.

As noted above, the diameters and relative diameters of the inside surface $81^{7x'}$ at the spring end $62^{7x'}$ and the surface $80^{7x'}$ correspond to those at the other spring end $60^{7x'}$.

With the pulley structure $10^{7x'}$ initially at rest, rotation of the first rotating member in the direction of the arrow T, as through a force imparted through the belt 20, causes the rotational speed of the first rotating member $22^{7x'}$ to be initially greater than that of the second rotating member $36^{7x'}$. At this point, the first spring end $60^{7x'}$ is frictionally held with respect to the surface $78^{7x'}$ to cause the spring holding portion $70^{7x'}$ and spring end $60^{7x'}$ to rotate in the direction of the arrow T at the same rotational speed. Rotation from the first rotating member $22^{7x'}$ is elastically transmitted to the second rotating member $36^{7x'}$ through the coil spring $54^{7x'}$, with the second spring end $62^{7x'}$ frictionally engaged with the spring holding portion $74^{7x'}$ on the second rotating member $36^{7x'}$. The first and second rotating members $22^{7x'}$, $36^{7x'}$ are rotated so as to tighten the coil spring $54^{7x'}$ to a point that the first and second rotating members $22^{7x'}$, $36^{7x'}$ rotate in the direction of the arrow T at the same rotational speed. In this state, both spring regions 156, 164 are stationary relative to their respective spring holding portions $70^{7x'}$, $74^{7x'}$.

In this state, in addition to the holding forces between the spring region 156 and the surface $78^{7x'}$, there are additional holding forces generated, as indicated at X1 in FIG. 23, between the inside surface $81^{7x'}$ of the coil spring $54^{7x'}$ and the surface $78^{7x'}$, as described for a prior embodiment with respect to FIG. 12. This same interaction occurs at the opposite spring end $62^{7x'}$. Thus, as the rotational speed is increased, there is an intensified holding force that minimizes the likelihood of slippage at the spring ends $60^{7x'}$, $62^{7x'}$. The spring ends $60^{7x'}$, $62^{7x'}$ thus remain stationary relative to their respective surfaces $78^{7x'}$, $80^{7x'}$.

In the event that the first rotating member $22^{7x'}$ rotates in the direction of the arrow T at a speed that is equal to or greater than that of the second rotating member $36^{7x'}$, an elastic rotational energy is stored in the middle spring region 162 in a direction of winding tending to relax the coil spring $54^{7x'}$. The first and second rotating members $22^{7x'}$, $36^{7x'}$ are thus able to instantaneously, elastically relatively rotate in opposite directions. By providing the space $146^{7x'}$, the spring $54^{7x'}$ can be wound to a smaller diameter, thereby allowing a stronger elastic rotational energy to be stored tending to change the spring $54^{7x'}$ to a relaxed, larger diameter state.

With the pulley structure on an overall system as shown in FIG. 1, in the event that the speed of the belt 20 is rapidly reduced through a variation in rotation of the drive shaft 18, a force is exerted on the first rotating member $22^{7x'}$ in the direction of the arrow L, tending to relax the coil spring $54^{7x'}$. As noted above, the first and second rotating members $22^{7x'}$, $36^{7x'}$ then instantaneously, elastically rotate relative to each other in opposite directions. Thus, when the belt speed is abruptly reduced, the first rotating member $22^{7x'}$ can be independently rotated in the direction of the arrow T relative to the second rotating member $36^{7x'}$ with continuing rotation from inertia tending to wind the coil spring $54^{7x'}$ so as to effect relaxation thereof.

The surface $78^{7x'}$ is rotated approximately 5° relative to the spring end $60^{7x'}$ in the direction of the arrow T from the above described stationary state. Thereafter, the spring $54^{7x'}$ relaxes without slippage occurring between the spring $54^{7x'}$ and first rotating member $22^{7x'}$ by reason of the interaction of the stop surface $116^{7x'}$ with the spring free end $118^{7x'}$, which is drive thereby circumferentially in the direction of the arrow A2.

At the other spring end $62^{7x'}$, the coils $56^{7x'}$ are wound to relax the same without producing slippage between the spring end $62^{7x'}$ and the second rotating member $36^{7x'}$. In this state, the spring ends $60^{7x'}$, $62^{7x'}$ are stationary relative to their respective surfaces $78^{7x'}$, $80^{7x'}$.

With the above construction, belt squeak can be controlled, with wear of the belt 20 controlled by reason of the absorption of the forces from the speed variation due to movement of the drive shaft 18. The effect in rotation on the second rotating member $36^{7x'}$ by reason of variations in rotational speed of the drive shaft 18 can also be controlled.

By reason of providing the portions $144^{7x'}$, $146^{7x'}$ of the spring containing chamber $52^{7x'}$, the center region 162 of the coil spring $54^{7x'}$, between the ends $60^{7x'}$, $62^{7x'}$, that does not engage either of the rotating members $22^{7x'}$, $36^{7x'}$, can enlarge and reduce in diameter. Thus, the coil spring $54^{7x'}$ can be wound to a relaxed state with an increased diameter at the start, thereby permitting a greater range of relative angular displacement between the first and second rotating members $22^{7x'}$, $36^{7x'}$. Through this arrangement, belt squeak can be controlled, as can belt wear by reason of absorbing rotational variations, as from the drive shaft 18.

Figure 24:
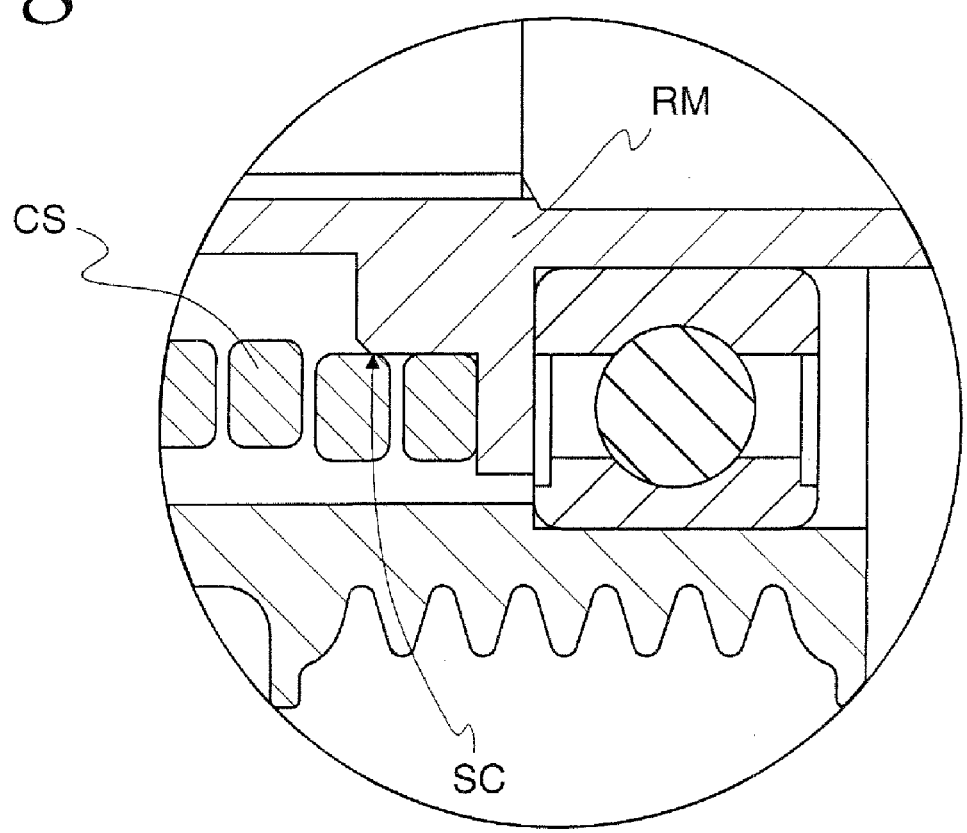
FIG. 24 is a fragmentary, cross-sectional view of the connection between an end of a coil spring and a rotating member.
Figure 25:
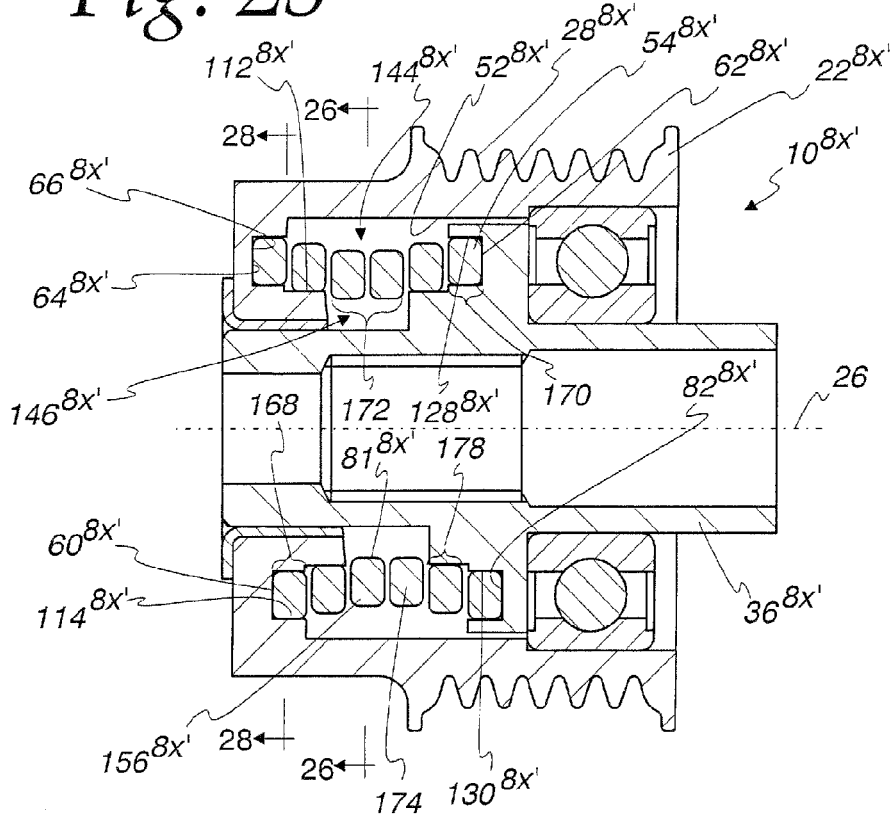
FIG. 25 is a cross-sectional view of a further modified form of pulley structure.
Figure 26:
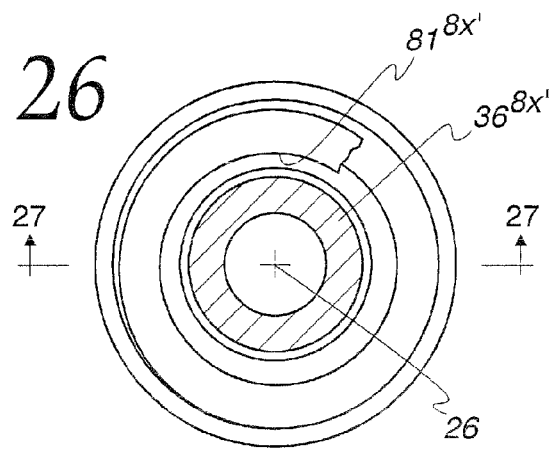
FIG. 26 is a cross-sectional view of the pulley structure taken along lines 26-26 in FIG. 25.
Figure 27:
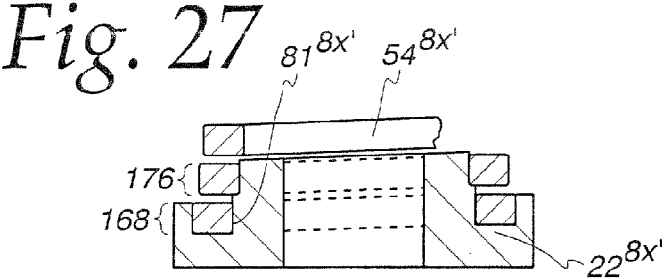
FIG. 27 is a cross-sectional view of the pulley structure taken along lines 27-27 of FIG. 26.

Further, over the coil region 156, 158, 164, 166, there is continuous contact with the surfaces $78^{7x'}$ and $80^{7x'}$. As a result, localized contact less than the width of the coils/turns $56^{7x'}$ does not exist as with the construction shown in FIG. 24 at the location SC between a coil spring CS and rotating member RM. This avoids stress concentrations as when there are speed variations from the drive shaft 18. This tends to avoid wearing and potential destruction of the coil spring $54^{7x'}$.

The coil spring $54^{7x'}$ can be made with a uniform diameter over its entire axial extent. By avoiding transition regions, stress concentrations can be avoided as may otherwise result through forcibly changing the inner diameter. This potentially minimizes wear and avoids destruction of the coil spring $64^{7x'}$ and/or the rotating members $22^{7x'}$, $36^{7x'}$, with the former as through fatigue rupture.

At each spring end $60^{7x'}$, $62^{7x'}$, more than one coil/turn $56^{7x'}$ may engage each of the surfaces $78^{7x'}$, $80^{7x'}$. This increases the frictional holding force between the spring ends $60^{7x'}$, $62^{7x'}$, and the first and second rotating members $22^{7x'}$, $36^{7x'}$. There is thus less likelihood of slippage at the spring ends $60^{7x'}$, $62^{7x'}$, which potentially accounts for more consistently predictable and reliable operation.

While typically, rotational forces will be imparted from the engine drive shaft 18 to the first rotating member $22^{7x'}$ and through the spring $54^{7x'}$ to the second rotating member $36^{7x'}$, there may be situations where rotational drive forces are transmitted initially to the second rotating member $36^{7x'}$, from where they are transmitted to the first rotating member $22^{7x'}$. In this case, the rotational drive forces are transmitted through the coil spring $54^{7x'}$, with power outputted from the first rotating member $22^{7x'}$ to the belt 20.

A further modified form of pulley structure is shown at $10^{8x'}$ in FIGS. 25-28. The pulley structure $10^{8x'}$ consists of a first rotating member $22^{8x'}$ and a second rotating member $36^{8x'}$, each rotatable about the axis 26 and relative to each other. A spring containing chamber $52^{8x'}$ is formed between the first and second rotating members $22^{8x'}$, $36^{8x'}$. A coil spring $54^{8x'}$ resides within the spring containing chamber $52^{8x'}$ and has ends $60^{8x'}$, $62^{8x'}$, respectively located in axially opening recesses $64^{8x'}$, $82^{8x'}$, respectively on the first and second rotating members $22^{8x'}$, $36^{8x'}$.

The axially opening recess $64^{8x'}$ is bounded by a radially outwardly facing surface $112^{8x'}$, a radially inwardly facing surface $114^{8x'}$, and an axially facing surface $66^{8x'}$.

The axially opening recess $82^{8x'}$ is bounded by a radially inwardly facing surface $128^{8x'}$ and a radially outwardly facing surface $130^{8x'}$.

The spacing between the radially inwardly and outwardly facing surfaces $114^{8x'}$, $112^{8x'}$; $130^{8x'}$, $128^{8x'}$ is closely matched to the radial, cross-sectional dimension of the coils/turns $56^{8x'}$ at attaching regions 168, 170, between which surfaces the regions 168, 170 respectively mount. With this construction, there is no requirement for a stop surface to engage the free spring end $118^{8x'}$, as in earlier described embodiments.

Figure 28:
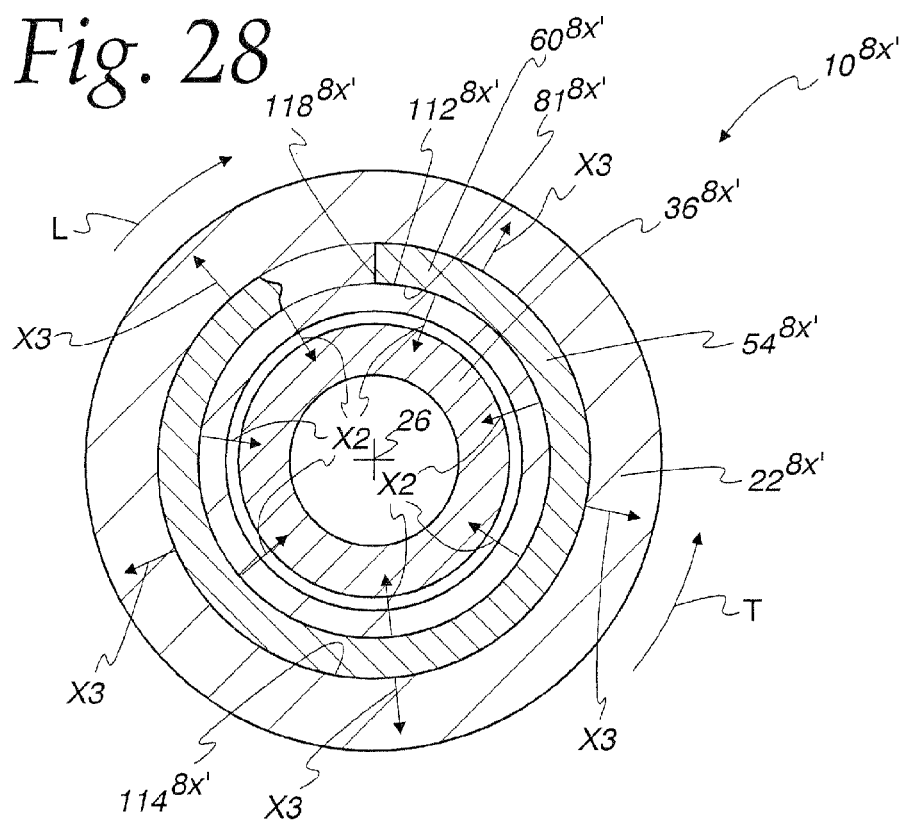
FIG. 28 is a cross-sectional view of the pulley structure taken along lines 28-28 of FIG. 25.
Figure 29:
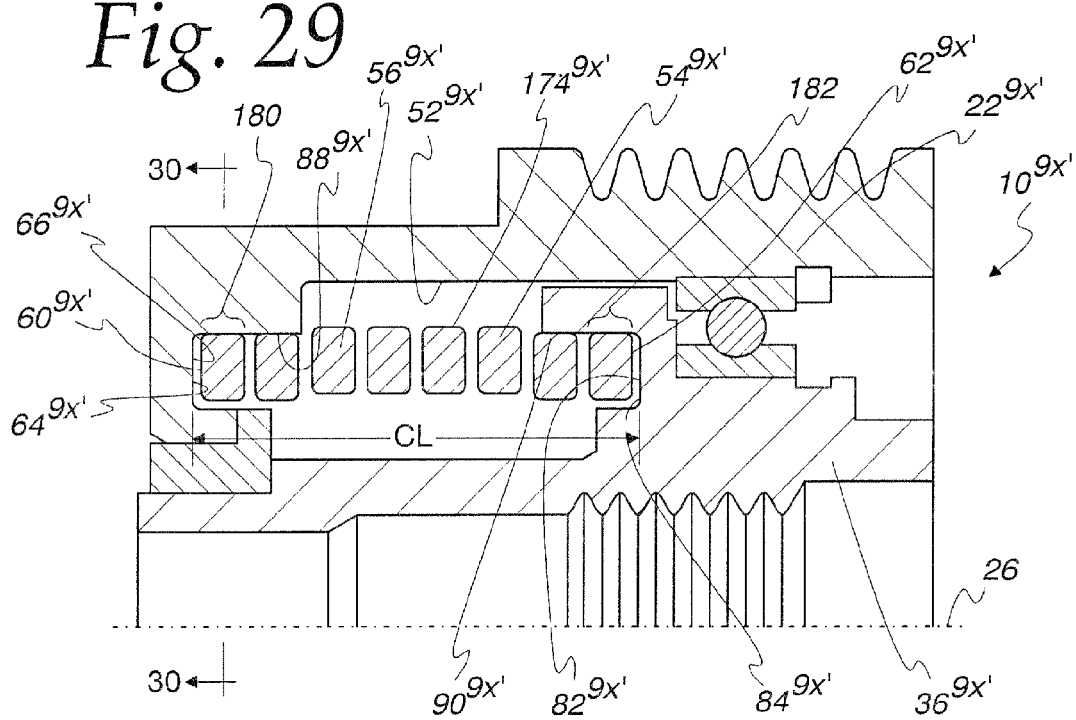
FIG. 29 is a cross-sectional view of one half of a further modified form of pulley structure.
Figure 30:
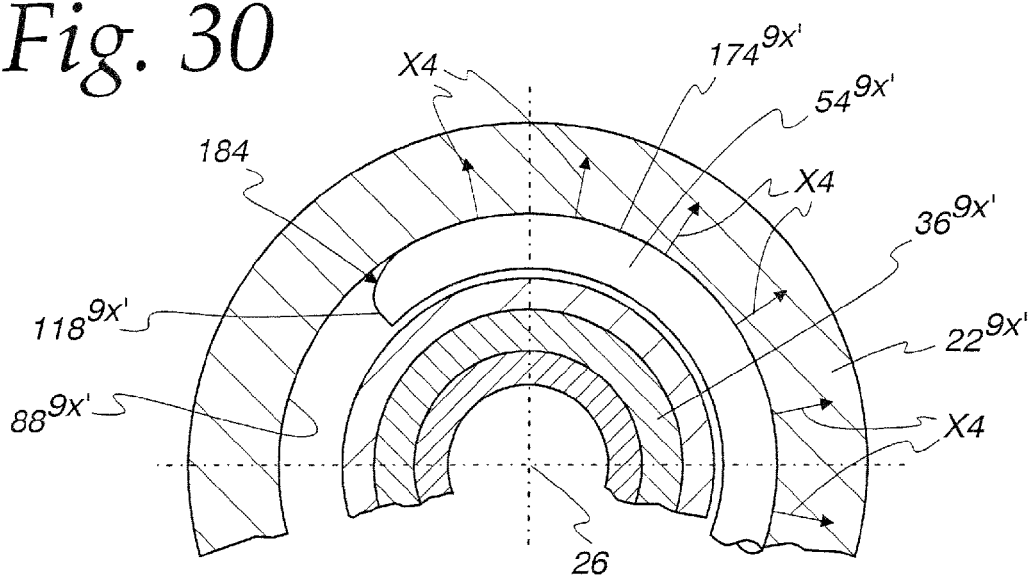
FIG. 30 is a cross-sectional view of the pulley structure taken along lines 30-30 of FIG. 29.

As seen in FIG. 28, with the first rotating member $22^{8x'}$ rotated about the axis 26 in the direction of the arrow T at a speed that is equal to or greater than that of the second rotating member $36^{8x'}$, by reason of the inside surface $81^{8x'}$ engaging the outwardly facing surface $112^{8x'}$ with a frictional holding force, the coil spring end $60^{8x'}$ follows movement of the surface $112^{8x'}$ at the attaching region 168. In the event that the first rotating member $22^{8x'}$ is rotated in a direction of the arrow T at a rotational speed less than that of the second rotating member $36^{8x'}$, the surface $112^{8x'}$ angularly shifts through approximately 5° in the direction of the arrow L relative to the inside surface $81^{8x'}$ at the region 168. Thereafter, the coil spring region 168 relaxes and bears against the radially inwardly facing surface $114^{8x'}$ so that the spring region 168 and first rotating member $22^{8x'}$ continue to rotate together. Similar structure is provided at the opposite spring end $62^{8x'}$ and operates in the same manner.

To allow this operation, the diameter of the inside surface $81^{8x'}$ at the regions 168, 170 is less than the diameters of the surfaces $112^{8x'}$, $130^{8x'}$, with the coil spring $54^{8x'}$ having a relaxed diameter. This produces a frictional holding force between the spring regions 168, 170 and the first and second rotating members $22^{8x'}$, $36^{8x'}$, respectively.

At start-up, the first rotating member $22^{8x'}$ will be moved around the axis 26 in the direction of the arrow T, which may be induced by the belt 20 shown in FIG. 1. At that point, the rotational speed of the first rotating member $22^{8x'}$ in the direction of the arrow T is greater than that for the second rotating member $36^{8x'}$. The coil spring region 168 is at this point frictionally held to the surface $112^{8x'}$ so that the spring region 168 and first rotating member $22^{8x'}$ rotate at the same speed. The rotational force applied to the spring $54^{8x'}$ is transmitted to the second rotating member $36^{8x'}$ by reason of the spring portion 170 being frictionally held to the second rotating member $36^{8x'}$. The force from the first rotating member $22^{8x'}$ is elastically transmitted through the coil spring $54^{8x'}$ to the second rotating member $36^{8x'}$. As this occurs, the movement of the first and second rotating members $22^{8x'}$, $36^{8x'}$ causes the coil spring $54^{8x'}$ to tighten by reducing the diameter to a point that the first and second rotating members $22^{8x'}$, $36^{8x'}$ are rotating at the same speed. In this state, the spring ends $60^{8x'}$, $62^{8x'}$ are frictionally held to the first and second rotating members $22^{8x'}$, $36^{8x'}$, respectively.

In addition to the frictional forces between the coil spring regions 168, 170 and surfaces $112^{8x'}$, $130^{8x'}$ at start-up, as rotation occurs, additional frictional holding forces identified at X2 in FIG. 28 are generated between the inside $81^{8x'}$ of the spring regions 168, 170 and the surfaces $112^{8x'}$, $130^{8x'}$. Thus, as the rotational speed increases, the forces identified at X2 likewise increase to avoid slippage between the coil spring ends $60^{8x'}$, $62^{8x'}$ and the first and second rotating members $22^{8x'}$, $36^{8x'}$.

In the event that the rotational speed of the first rotating member $22^{8x'}$ in the direction of the arrow T is equal to or greater than that of the second rotating member $36^{8x'}$, the unsupported middle region 172 of the coil spring $54^{8x'}$ is tightened by being reduced in diameter and moves into the portion $146^{8x'}$ of the spring containing chamber $52^{8x'}$. As a result, elastic rotational energy is stored in the coil spring $54^{8x'}$ tending to relax the same. Relative rotation between the first and second rotating members $22^{8x'}$, $36^{8x'}$ is thus permitted. By reason of including the portion $146^{8x'}$ of the space $52^{8x'}$, the coil spring $54^{8x'}$ can be wound to a substantially smaller diameter to develop a strong elastic rotational energy that, when released, tends to unwind/relax the coil spring.

The larger diameters of the coils $56^{8x'}$ also permit storage of an even larger, elastic rotational energy.

In the event that the speed of the belt 20 is rapidly reduced, as by variation in the speed of the engine drive shaft 18, a force is exerted on the first rotating member $22^{8x'}$ in a direction of the arrow L tending to relax the coil spring $54^{8x'}$ As noted previously, relative elastic rotational movement between the first and second members $22^{8x'}$, $36^{8x'}$ is permitted by reason of the elastic force of the coil spring $54^{8x'}$. Thus, when the belt speed is abruptly reduced, and the second rotating member $36^{8x'}$ continues to rotate under inertia tending to relax the coil spring $54^{8x'}$, the second rotating member $36^{8x'}$ can be rotated independently in the direction of the arrow L. The surface $112^{8x'}$ is allowed to rotate independently of the coil spring portion 168 in the direction of the arrow L through approximately 5°. Thereafter, by reason of the coil spring $54^{8x'}$ relaxing, the diameter of the coil spring $54^{8x'}$ increases, as a result of which the outside surface 174 of the coil spring $54^{8x'}$ is frictionally biased against the surface $114^{8x'}$ at the spring portion 168. Accordingly, radially outward forces, as indicated by the arrows X3 in FIG. 28 produce frictional holding forces that prevent slippage between the coil spring $54^{8x'}$ and the surface $114^{8x'}$ on the first rotating member $22^{8x'}$. The same structure exists at the other spring end $62^{8x'}$ and functions in the same manner. Accordingly, in this state, the spring ends $60^{8x'}$, $62^{8x'}$ are held stationary with respect to the first and second rotating members $22^{8x'}$, $36^{8x'}$.

As a result, belt squeaking is minimized and belt wear can be avoided by gradually absorbing forces due to speed variations. Speed variations as effecting the second rotating member $36^{8x'}$ can also be accommodated.

As with a prior embodiment, the inside surface $81^{8x'}$ of the coil spring $54^{8x'}$ continuously contacts the surface $112^{8x'}$ through the region 168 and a transition region 176.

A similar arrangement is provided for the region 170 and transition region 178 at the spring end $62^{8x'}$. By reason of this continuous contact, stress concentrations due to localized contact between the coil spring $54^{8x'}$ and first and second rotating members $82^{8x'}$, $36^{8x'}$ can be avoided, reducing the likelihood of wear and/or destruction of the coil spring $54^{8x'}$.

A coil spring $54^{8x'}$, with coils $56^{8x'}$ having uniform diameter between the ends $60^{8x'}$ $62^{8x'}$, accommodates states wherein the first and second rotating members $22^{8x'}$, $36^{8x'}$ are rotated at the same rotational speed and wherein the first rotating member $22^{8x'}$ is rotated at a speed less than that of the second rotating member $36^{8x'}$.

By reason of the radial dimensions of the spring turns $56^{8x'}$ at the regions 168, 170 matching the radial dimensions of the axially opening recesses $64^{8x'}$, $82^{8x'}$, the coil spring $54^{8x'}$ can be consistently, firmly and stably mounted in a straight orientation without inclination with respect to the axis 26 and each of the first and second rotating members $22^{8x'}$, $36^{8x'}$. In the event that the coil spring $54^{8x'}$ is mounted in an inclined manner, an excessively large rotative force induced by a speed variation in one of the first and second rotating members $22^{8x'}$, $36^{8x'}$ might damage or destroy the coil spring $54^{8x'}$. Because the inventive structure facilitates non-skewed mounting of the coil spring $54^{8x'}$, forces from significant speed variations may be absorbed by the entire spring $54^{8x'}$. As a result, the anticipated life of the coil spring $54^{8x'}$ may be extended.

While the coil spring regions 168, 170 are shown to be made up of a single coil/turn $56^{8x'}$, more than one coil/turn at each such location is contemplated.

As noted above, it is also desirable to lighten the weight of the first rotating member $22^{8x'}$ in the automotive environment. Thus, the rotational moment of inertia thereof can be reduced. The required tension to maintain a desired speed can be minimized. Thus, a force exceeding a static friction force between the belt and pulley surface $28^{8x'}$ can be relatively small, whereby the belt is not as prone to being worn and its anticipated life potentially extended. The first rotating member $22^{8x'}$ can be reduced in weight by either providing cutout portions or by making the same of a lighter material, such as aluminum, or other light alloy.

While the cross-sectional configuration of the coil spring $54^{8x'}$ is shown to be quadrangular/rectangular, other shapes are contemplated, such as circular, square, etc. The significance of this shape selection is described above.

In FIGS. 29-33, a further modified form of pulley structure is shown at $10^{9x'}$. The pulley structure $10^{9x'}$ consists of a first rotating member $22^{9x'}$ and a second rotating member $36^{9x'}$ that are rotatable around the axis 26 and relative to each other. A spring containing chamber $52^{9x'}$ is defined between the first and second rotating members $22^{9x'}$, $36^{9x'}$. A coil spring $54^{9x'}$ resides within the chamber $52^{9x'}$ and has spaced ends $60^{9x'}$, $62^{9x'}$, which respectively fit in axially opening recesses $64^{9x'}$, $82^{9x'}$ on the first and second rotating members $22^{9x'}$, $36^{9x'}$. The coil spring ends $60^{9x'}$, $62^{9x'}$ bear respectively against radially inwardly facing surfaces $88^{9x'}$, $90^{9x'}$ on the first and second rotating members $22^{9x'}$, $36^{9x'}$, respectively. The coil spring $54^{9x'}$ has regions 180, 182 that respectively contact the surfaces $88^{9x'}$, $90^{9x'}$. The surface $88^{9x'}$ may be hardened, as by a hard chromium plating process, to reduce wear. The radial dimension of the axially opening recesses $64^{9x'}$, $82^{9x'}$ is not limited but must be sufficient to accommodate the radial dimension of the coil spring turns $56^{9x'}$.

With the coil spring $54^{9x'}$ having a relaxed diameter, separated from the remainder of the structure, the outside surface $174^{9x'}$ has a diameter that is greater than the diameter of the surfaces $88^{9x'}$, $90^{9x'}$. Thus, the spring $54^{9x'}$ must be reduced to a loading diameter to be placed operatively within the axially opening recesses $64^{9x'}$, $82^{9x'}$. The residual, elastic restoring force in the coil spring $54^{9x'}$ thus urges the outside surface $174^{9x'}$ frictionally against the surfaces $88^{9x'}$, $90^{9x'}$. The residual forces produced in a radial direction are indicated by the arrows X4 in FIG. 30.

Figure 31:
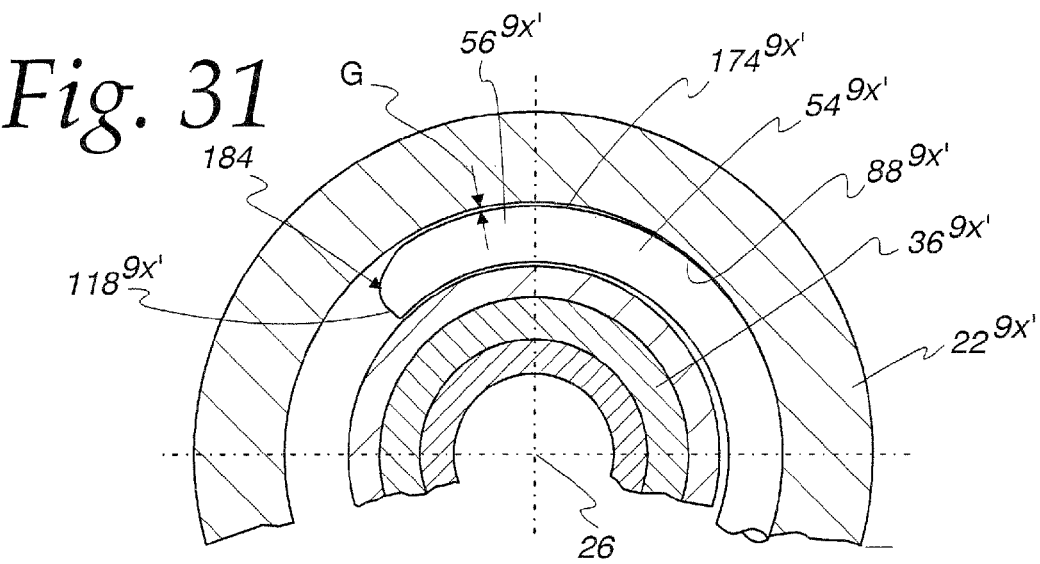
FIG. 31 is a view as in FIG. 30, with the rotating members in a different relative position.
Figure 32:
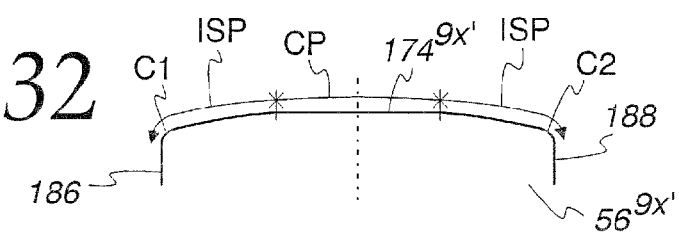
FIG. 32 is a schematic representation of a friction generating surface on a side of the coil spring that engages one of the rotating members.

As seen in FIG. 31, the coil spring free end $118^{9x'}$ at the corner 184 has a relief and is rounded so that the free end $118^{8x'}$ blends smoothly into the outside surface $174^{9x'}$. As seen in FIG. 32, the axial center portion CP of the surface $174^{9x'}$ has a crown shape in cross section and inclines at equal angles oppositely towards the axial ends 186, 188 of the depicted coil $56^{9x'}$. The inclined surface portions are each identified as ISP. The corners C1, C2 are rounded where the outside surface $174^{9x'}$ blends into the ends 186, 188.

The connection between the spring end $62^{9x'}$ and second rotating member $38^{9x'}$ may be the same as that described above between the first rotating member $22^{9x'}$ and the spring end $60^{9x'}$.

The spring ends $60^{9x'}$, $62^{9x'}$ are respectively frictionally engaged with the first and second rotating members $22^{9x'}$, $36^{9x'}$, to follow rotational movement thereof around the axis 26. Rotational forces are transmitted between the first and second rotating members $22^{9x'}$, $36^{9x'}$ through the coil spring $54^{9x'}$.

When a rotational force transmitted from the first rotating member $22^{9x'}$ to the second rotating member $36^{9x'}$ is increased, at a point that the force exceeds the frictional holding force, the coil spring $54^{9x'}$ is allowed to slip relative to the first rotating member $22^{9x'}$ and/or second rotating member $36^{9x'}$, whereby the first and second rotating members $22^{9x'}$, $36^{9x'}$ rotate relative to each other. At that point, frictional forces are changed from static to dynamic frictional forces and the frictional holding forces between the coil spring $54^{9x'}$ and first and second rotating members $22^{9x'}$, $36^{9x'}$ are decreased. The forces transmitted between the first and second rotating members $22^{9x'}$, $36^{9x'}$ are thus decreased.

The larger the rotational force transmitted from the first rotating member $22^{9x'}$ to the second rotating member $36^{9x'}$, the larger is the increase in rotational speed of the second rotating member $36^{9x'}$ per unit time. Thus, by transmitting a large rotational force, an abrupt change in speed occurs.

However, with the structure shown, the coil spring $54^{9x'}$ slips with an applied rotational force/torque equal to or greater than a force/torque of a predetermined magnitude. Beyond that torque, there is slippage. As a result, an abrupt variation of the rotational speed of the following second rotating member $36^{9x'}$ can be avoided.

Since, in transmitting rotational forces, the coil spring $54^{9x'}$ supports the first and second rotating members $22^{9x'}$, $36^{9x'}$ at the contact regions 180, 182, the frictional forces between the coil spring $54^{9x'}$ and surfaces $88^{9x'}$, $90^{9x'}$ are dispersed over the entire radial contact areas 180, 182. Thus, stress concentration at discrete locations on the coil spring $54^{9x'}$ can be avoided, thereby reducing the likelihood of fatigue rupture. Further, since the rotational torque imparted to the coil spring $54^{9x'}$ is not increased excessively, spring deterioration can be avoided.

There may be situations encountered wherein there is an abrupt increase in the rotational speed of the first rotating member $22^{9x'}$ with the coil spring $54^{9x'}$ frictionally gripped between the first and second rotating members $22^{9x'}$, $36^{9x'}$. If the rotational torque which is to be transmitted from the first rotating member $22^{9x'}$ to the second rotating member $36^{9x'}$ exceeds the predetermined magnitude that can be transmitted with the frictional force between the components, the first and/or second rotating members $22^{9x'}$, $36^{9x'}$ slips relative to the coil spring $54^{9x'}$. Accordingly, there is not an abrupt change in speed that occurs with the second rotating member $36^{9x'}$.

Similarly, if the rotational speed of the first rotating member $22^{9x'}$ per unit time is great, slippage can occur that avoids full force transmission to the second rotating member $36^{9x'}$. In this case, the rotational force is one tending to retard the rotation of the second rotating member $36^{9x'}$ which tends to continue rotating under inertial forces. When the rotational force is equal to or greater than the predetermined magnitude capable of being transmitted between the coil spring $54^{9x'}$ and first and second rotating members $22^{9x'}$, $36^{9x'}$, the first and/or second rotating members $22^{9x'}$, $36^{9x'}$ are allowed to slip relative to the coil spring $54^{9x'}$. An abrupt reduction in the rotational speed of the second rotating member $36^{9x'}$ is thus avoided.

In the event that the system $10^{9x'}$ experiences repetitive slippage, there is a possibility that the surfaces $88^{9x'}$, $90^{9x'}$ might be modified in terms of their frictional characteristics. That is, the coefficient of friction between the cooperating surfaces $88^{9x'}$, $90^{9x'}$ and $174^{9x'}$ may change in the absence of some safeguard being taken. This wear may cause unpredictability of operation and instability. Accordingly, the surfaces $88^{9x'}$, $90^{9x'}$ may be subjected to hard chromium plating to reduce the likelihood of wear. Other forms of plating are contemplated. For example, nickel plating, high frequency quenching, ceramic application through spraying, or the like, are contemplated. This concept applies to all embodiments described herein.

In this embodiment, the spring $54^{9x'}$ has a quadrangular/squared/rectangular cross-sectional configuration. This provides a stable contact surface on the individual coils $56^{9x'}$. The rounded corner 184 eliminates sharp edges that have a tendency to damage cooperating surfaces on the first and/or second rotating members $22^{9x'}$, $36^{9x'}$. This rounded corner configuration also facilitates installation of the coil spring $54^{9x'}$. Still further, the crowning effect due to the configuration shown in FIG. 32 also eliminates sharp transition points that may inflict damage upon the cooperating surfaces on the first and/or second rotating members $22^{9x'}$, $36^{9x'}$.

Still further, as shown in FIG. 31, by bending the coil spring $54^{9x'}$ in the vicinity of the free end $118^{9x'}$, the diameter of the particular coil $56^{9x'}$ is reduced. This configuration produces a gap G between the surface $174^{9x'}$ and the first rotating member surface $88^{9x'}$ adjacent to the free end $118^{9x'}$. This additionally potentially minimizes damage to the surface $88^{9x'}$.

Figure 33:
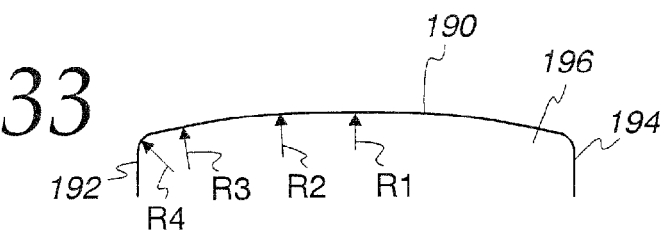
FIG. 33 is a view as in FIG. 32 of a modified form of surface.

The invention also contemplates that the configuration of the coil spring $54^{9x'}$ can be changed from that described above. In FIG. 33, a modified form of the surface $174^{9x'}$ is shown at 190. The surface 190 is crowned and defined by a series of radii R1, R2, R3, R4, which progressively decrease in length from the center towards the axial sides 192, 194 of the depicted coil/turn 196. This provides a continuously curved configuration for the surface 190 into the sides 192, 194. This arrangement avoids damage infliction due to sharp edges and also provides a stable contact surface 190.

The larger the elastic recovery force due to the relative movement of the first and second rotating members $22^{9x'}$, $36^{9}X'$, the larger is the rotational force required to cause slippage. This is true of all embodiments described herein. Each system will have a predetermined rotational torque at which slippage occurs. This predetermined rotational torque can be adjusted by adjusting the coil diameter of the coil spring $54^{9x'}$ or by selecting an appropriate modulus of elasticity for the material.

Further, it is not required that the coil diameter be uniform over the axial length of the spring $54^{9x'}$. The elastic recovery force can be changed by increasing the coil diameter in the contact regions 180, 182.

Further, by selecting a cavity length CL between axially facing surfaces $66^{9x'}$ and $84^{9x'}$ bounding the axially opening recess $64^{9x'}$, $82^{9x'}$, sound generation can be controlled. More particularly, by making the length CL slightly less than the relaxed axial length of the coil spring $54^{9x'}$, the opposite ends $60^{9x'}$, $62^{9x'}$ are brought into contact with the first and second rotating members $22^{9x'}$, $36^{9x'}$ and the coil spring $54^{9x'}$ is compressed axially. Preferably, the increase in axial length over the cavity length CL is on the order of 0.2 mm to 5 mm.

Figure 34:
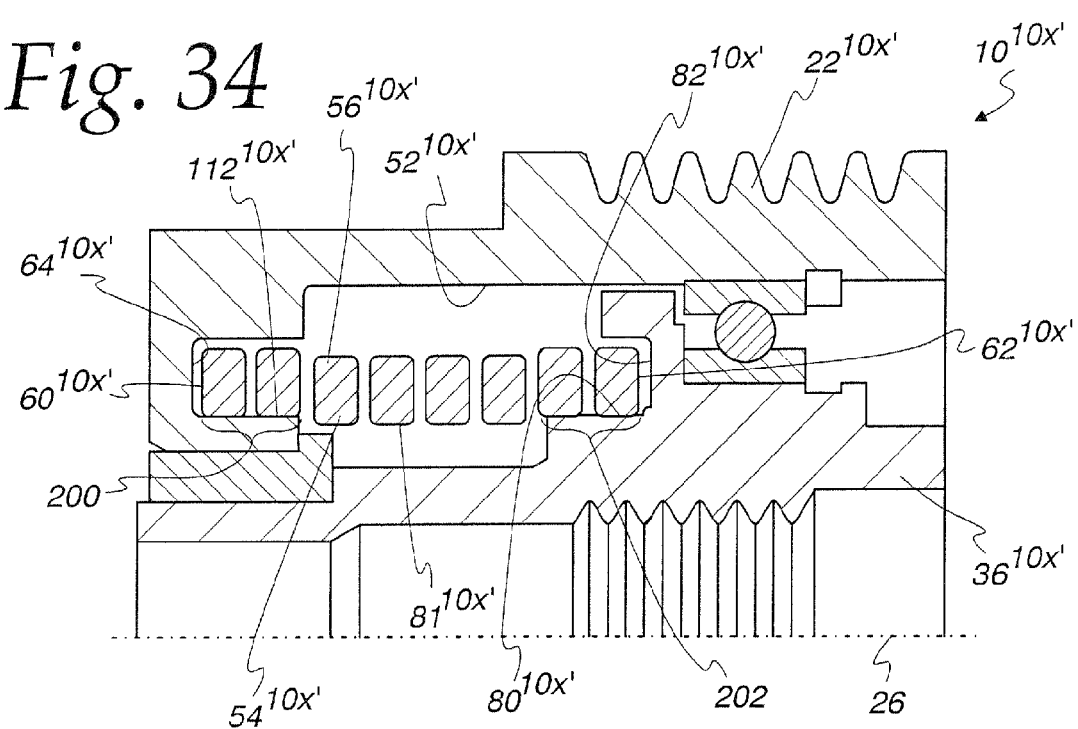
FIG. 34 is a cross-sectional view of one half of a further modified form of pulley structure.
Figure 35:
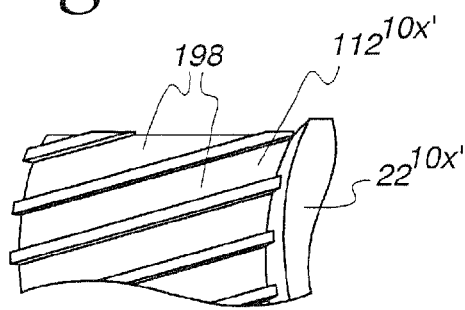
FIG. 35 is a fragmentary, perspective view of a surface that frictionally engages a part of a coil spring and is altered by including discrete grooves.

An additional form of pulley structure is shown at $10^{10x'}$ in FIGS. 34 and 35. The pulley structure $10^{10x'}$ consists of a first rotating member $22^{10x'}$ and a second rotating member $36^{10x'}$. The first and second rotating members $22^{10x'}$, $36^{10x'}$ are rotatable about the axis 26 and with respect to each other. The coil spring $54^{10x'}$ resides in a spring containing chamber $52^{10x'}$ between the first and second rotating members $22^{10x'}$, $36^{10x'}$. The coil spring $54^{10x'}$ has axially spaced ends $60^{10x'}$ and $62^{10x'}$ which respectively reside in axially opening recesses $64^{10x'}$, $82^{10x'}$. The coil spring $54^{10x'}$ has an inside surface $81^{10x'}$ that cooperates with radially outwardly facing surfaces $112^{10x'}$ and $80^{10x'}$ on the first rotating member $22^{10x'}$ and second rotating member $36^{10x'}$, respectively.

In this embodiment, the surface $112^{10x'}$ has inclined grooves 198 therein at regularly spaced intervals around the circumference of the surface $112^{10x'}$. The inside $81^{10x'}$ of the coil spring $54^{10x'}$ contacts the surface $112^{10x'}$ over the axial region 200.

The coil spring $54^{10x'}$ at the region 200 has a relaxed diameter that must be increased to a loading diameter to surround the surface $112^{10x'}$. The residual elastic force in the deformed spring $54^{10x'}$ radially biases coils $56^{10x'}$ to against the surface $112^{10x'}$ to produce a frictional holding force at the spring region 200.

The opposite spring end $62^{10x'}$ has a similar region 202 wherein coils $56^{10x'}$ thereon are, under a residual radial force, biased to against the surface $80^{10x'}$ to produce a frictional holding force.

As in the earlier described embodiments, the rotational force of a predetermined magnitude causes slippage between the coil spring $54^{10x'}$ and the cooperating first and second rotating members $22^{10x'}$, $36^{10x'}$. By reason of including the grooves 198, the frictional coefficient between the surface $112^{10x'}$ and the surface $81^{10x'}$ on the coil spring $54^{10x'}$ is reduced, whereupon the coil spring $54^{10x'}$ at the regions 200, 202 slips more readily.

By altering the surfaces that cooperate with the coil spring $54^{10x'}$, the magnitude of the predetermined force that causes slippage can be changed and selected according to requirements.

Figure 36:
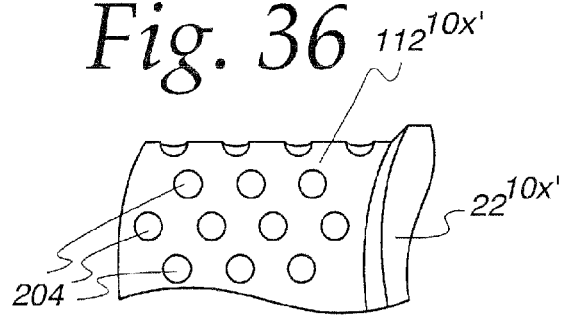
FIG. 36 is a view as in FIG. 35 wherein the surface is altered by including depressions.

As an alternative to the use of the grooves 198, as shown in FIG. 36, the surface $112^{1x'}$ may be embossed with discrete impressions 204.

Figure 37:
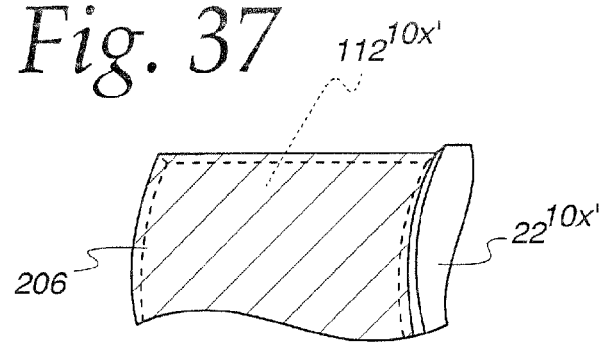
FIG. 37 is a view as in FIGS. 35 and 36 wherein the surface is altered by including a cover material.

As a still further alternative, as shown in FIG. 37, the surface $112^{10x'}$ on the first member $22^{10x'}$ may be covered with a material 206 having desired frictional characteristics. The material 206 may be applied as a coating or as a separate, self-contained layer. For example, the layer 206 may be a dry metal having desired frictional characteristics.

It is also contemplated that the surface $80^{10x'}$ may be treated to select its frictional characteristics the same as described for the surface $112^{10x'}$ above.

The foregoing disclosure of specific embodiments is intended to be illustrative of the broad concepts comprehended by the invention.

The invention claimed is:

1. A pulley structure comprising:
a first rotating member that is rotatable around a first axis;
a second rotating member that is rotatable around the first axis and in at least partial axial coincidence with the first rotating member;
a spring containing chamber defined between the first and second rotating members; and
a spring comprising axially spaced first and second ends defined by coils extending around the first axis,
at least one coil at each of the first and second axially spaced ends of the spring radially biased relative to the first axis thereby to be frictionally held against each of the first and second rotating members to thereby allow forces generated by relative rotation between the first and second rotating members to be transmitted through the spring,
the spring comprising one plurality of coils extending between the coils at the first and second spring ends,
another plurality of coils within the one plurality of coils changing in diameter as the first and second rotating members are relatively rotated,
the spring and first and second rotating members configured so that coils in the another plurality of coils, over a substantial axial extent of the spring, between the first and second spring ends, remain at all times unsupported by and out of contact with the first and second rotating members as the first and second rotating members are rotated relative to each other in operation,
wherein the first member has an axially opening recess with radially inwardly and outwardly facing surfaces defined by the first member and spaced by a first distance and the at least one coil at the first end of the spring extends into the axially opening recess.

2. The pulley structure according to claim 1 wherein the first end of the spring comprises a first plurality of coils having a first relaxed diameter and at least a first coil in the first plurality of coils is elastically deformed to be changed from the first relaxed diameter to a first loading diameter whereby a resulting residual elastic force radially biases the at least first coil against the first rotating member so that the at least first coil is thereby frictionally held against the first rotating member to follow rotational movement of the first rotating member around the first axis.

3. The pulley structure according to claim 2 wherein the second end of the spring comprises a second plurality of coils having a second relaxed diameter and at least a second coil in the second plurality of coils is elastically deformed to be changed from the second relaxed diameter to a second loading diameter whereby a resulting residual elastic force radially biases the at least second coil against the second rotating member so that the at least second coil is thereby frictionally held against the second rotating member to follow rotational movement of the second rotating member around the first axis.

4. The pulley structure according to claim 1 wherein the spring is connected to the first and second rotating members only by frictional holding forces between the spring and the first and second rotating members.

5. The pulley structure according to claim 3 wherein at least one of the at least first and second coils is reduced in diameter by reason of being changed from its relaxed diameter into its loading diameter to thereby exert a radially outward holding force on at least one of the first and second rotating members.

6. The pulley structure according to claim 3 wherein at least one of the at least first and second coils is increased in diameter by reason of being changed from its relaxed diameter into its loading diameter to thereby exert a radially inward holding force on at least one of the first and second rotating members.

7. The pulley structure according to claim 3 wherein one of the first and second rotating members has an axially projecting spring holding portion and at least one coil in one of the first and second plurality of coils exerts a radial holding force on the spring holding portion.

8. The pulley structure according to claim 7 wherein the spring holding portion has a radially outwardly facing surface against which the at least one coil in the one of the first and second plurality of coils exerts a radial holding force.

9. The pulley structure according to claim 3 wherein one of the first and second rotating members has a radially facing surface against which at least one coil in one of the first and second plurality of coils is frictionally held, the radially facing surface has a first portion with a substantially uniform diameter against which at least one coil bears, and the radially facing surface has a second portion that has a tapered diameter that is axially spaced from the first portion.

10. The pulley structure according to claim 9 wherein the one of the first and second rotating members with the radially facing surface has an axially projecting spring holding portion with a terminal end and the second portion extends from the terminal end axially to the first portion of the radially facing surface.

11. The pulley structure according to claim 9 wherein the first portion of the radially facing surface faces radially outwardly.

12. The pulley structure according to claim 1 wherein the spring comprises a coil spring with coils, each with a diameter, extending fully between the axially spaced first and second ends and the coils have different diameters with the spring in a relaxed state.

13. The pulley structure according to claim 12 wherein one of the first and second rotating members has a spring holding portion with a radially outwardly facing surface, at least one coil at one of the axially spaced ends of the spring has a first diameter that surrounds the radially outwardly facing surface on the spring holding portion and the coil spring has at least a second coil between the axially spaced ends that has a second diameter that is greater than the first diameter.

14. The pulley structure according to claim 13 wherein the second coil does not engage either of the first or second rotating members.

15. The pulley structure according to claim 9 wherein the uniform diameter of the first portion of the radially facing surface is centered on the first axis.

16. The pulley structure according to claim 1 wherein one of the first and second rotating members has a radially facing surface having a non-uniform diameter that engages the spring.

17. The pulley structure according to claim 16 wherein the radially facing surface has a diameter that changes progressively in an axial direction.

18. The pulley structure according to claim 1 wherein the spring has coils with a cross-sectional shape that is quadrangular.

19. The pulley structure according to claim 3 wherein one of the first and second plurality of coils and first and second rotating members cooperate so that application of a rotational force of a first magnitude to the one of the first and second rotating members causes the one of the first and second rotating members to circumferentially stop relative to the one of the first and second plurality of coils.

20. The pulley structure according to claim 3 wherein one of the first and second plurality of coils and first and second rotating members cooperate so that an increase in rotational speed per unit time of the one of the first and second rotating members, equal to or greater than a predetermined amount, causes slippage circumferentially between the one of the first and second rotating members and the one of the first and second plurality of coils.

21. The pulley structure according to claim 3 wherein one of the first and second plurality of coils and first and second rotating members cooperate so that a decrease in rotational speed per unit time equal to or greater than a predetermined amount causes slippage circumferentially between the one of the first and second rotating members and the first and second plurality of coils.

22. The pulley structure according to claim 1 wherein the first rotating member has a radially facing surface against which at least one coil exerts a radial frictional holding force that is subjected to a hardening treatment.

23. The pulley structure according to claim 1 wherein the first rotating member has a radially facing surface against which at least one coil exerts a radial frictional holding force, wherein the radially facing surface is altered to change the friction characteristics of the radially facing surface.

24. The pulley structure according to claim 23 wherein the radially facing surface is altered by forming discrete grooves and/or depressions therein.

25. The pulley structure according to claim 1 wherein the at least one coil has a quadrangular cross-sectional shape and a circumferentially facing free end, the at least one coil has a radially facing surface, the radially facing surface and free end meeting at a corner that is rounded.

26. The pulley structure according to claim 1 wherein the at least one coil has a quadrangular cross-sectional shape and a radially facing surface that frictionally engages the first rotating member and is rounded to produce a crown.

27. The pulley structure according to claim 3 wherein the first member has a radially facing surface and the spring has an attaching region that engages the radially facing surface and a transition region that is in axial coincidence with the radially facing surface but does not engage the radially facing surface with the spring in a relaxed state.

28. The pulley structure according to claim 27 wherein the spring comprises a plurality of coils extending continuously between the first and second axially spaced ends of the spring and the coils at the attaching and transition regions have diameters less than a diameter of at least one coil between the axially spaced ends of the spring with the spring in a relaxed state.

29. The pulley structure according to claim 1 wherein the at least one coil has a radial cross-sectional dimension that is approximately equal to the first distance.

30. The pulley structure according to claim 1 wherein the spring has a plurality of coils between the first and second axially spaced ends that do not engage either of the first or second rotating members.

31. The pulley structure according to claim 30 wherein the spring containing chamber has a portion within which the plurality of coils between the first and second axially spaced ends can expand radially.

32. The pulley structure according to claim 30 wherein the spring containing chamber has a portion within which the plurality of coils between the first and second axially spaced ends can contract radially.

33. The pulley structure according to claim 3 wherein one of the first and second plurality of coils and first and second rotating members cooperate so that an increase in rotational speed per unit time of the one of the first and second rotating members, equal to or greater than a predetermined amount, causes slippage circumferentially between the one of the first and second rotating members and the one of the first and second plurality of coils.

34. The pulley structure according to claim 3 wherein one of the first and second plurality of coils and first and second rotating members cooperate so that a decrease in rotational speed per unit time equal to or greater than a predetermined amount causes slippage circumferentially between the one of the first and second rotating members and the first and second plurality of coils.

35. A pulley structure comprising:
a first rotating member that is rotatable around a first axis;
a second rotating member that is rotatable around the first axis and in at least partial axial coincidence with the first rotating member;
a spring containing chamber defined between the first and second rotating members; and
a spring comprising axially spaced first and second ends defined by coils extending around the first axis,
at least one coil at each of the first and second axially spaced ends of the spring radially biased relative to the first axis thereby to be frictionally held against each of the first and second rotating members to thereby allow forces generated by relative rotation between the first and second rotating members to be transmitted through the spring,
the spring comprising one plurality of coils extending between the coils at the first and second spring ends,
another plurality of coils within the one plurality of coils changing in diameter as the first and second rotating members are relatively rotated,
the spring and first and second rotating members configured so that coils in the another plurality of coils, over a substantial axial extent of the spring, between the first and second spring ends, remain at all times unsupported by and out of contact with the first and second rotating members as the first and second rotating members are rotated relative to each other in operation,
wherein the first end of the spring comprises a first plurality of coils having a first relaxed diameter and at least a first coil in the first plurality of coils is elastically deformed to be changed from the first relaxed diameter to a first loading diameter whereby a resulting residual elastic force radially biases the at least first coil against the first rotating member so that the at least first coil is thereby frictionally held against the first rotating member to follow rotational movement of the first rotating member around the first axis, wherein the second end of the spring comprises a second plurality of coils having a second relaxed diameter and at least a second coil in the second plurality of coils is elastically deformed to be changed from the second relaxed diameter to a second loading diameter whereby a resulting residual elastic force radially biases the at least second coil against the second rotating member so that the at least second coil is thereby frictionally held against the second rotating member to follow rotational movement of the second rotating member around the first axis, wherein the first rotating member has a first axially opening recess bounded by radially inwardly and outwardly facing surfaces defined by the first rotating member into which the spring extends.

36. The pulley structure according to claim 35 wherein the second rotating member has a second axially opening recess bounded by radially inwardly and outwardly facing surfaces defined by the second rotating member into which the spring extends.

37. The pulley structure according to claim 36 wherein the first and second axially opening recesses open towards each other.

38. The pulley structure according to claim 35 wherein the first rotating member has an axially projecting spring holding portion and at least one coil in one of the first and second plurality of coils exerts a radial holding force on the spring holding portion.

39. A pulley structure comprising:
a first rotating member that is rotatable around a first axis;
a second rotating member that is rotatable around the first axis and in at least partial axial coincidence with the first rotating member;
a spring containing chamber defined between the first and second rotating members; and
a spring comprising axially spaced first and second ends defined by coils extending around the first axis,
at least one coil at each of the first and second axially spaced ends of the spring radially biased relative to the first axis thereby to be frictionally held against each of the first and second rotating members to thereby allow forces generated by relative rotation between the first and second rotating members to be transmitted through the spring,
the spring comprising one plurality of coils extending between the coils at the first and second spring ends,
another plurality of coils within the one plurality of coils changing in diameter as the first and second rotating members are relatively rotated,
the spring and first and second rotating members configured so that coils in the another plurality of coils, over a substantial axial extent of the spring, between the first and second spring ends, remain at all times unsupported by and out of contact with the first and second rotating members as the first and second rotating members are rotated relative to each other in operation,
wherein the first end of the spring comprises a first plurality of coils having a first relaxed diameter and at least a first coil in the first plurality of coils is elastically deformed to be changed from the first relaxed diameter to a first loading diameter whereby a resulting residual elastic force radially biases the at least first coil against the first rotating member so that the at least first coil is thereby frictionally held against the first rotating member to follow rotational movement of the first rotating member around the first axis, wherein the second end of the spring comprises a second plurality of coils having a second relaxed diameter and at least a second coil in the second plurality of coils is elastically deformed to be changed from the second relaxed diameter to a second loading diameter whereby a resulting residual elastic force radially biases the at least second coil against the second rotating member so that the at least second coil is thereby frictionally held against the second rotating member to follow rotational movement of the second rotating member around the first axis, wherein one of the first and second rotating members has a radially facing surface against which at least one coil in one of the first and second plurality of coils is frictionally held, the radially facing surface has a first portion with a substantially uniform diameter against which at least one coil bears, and the radially facing surface has a second portion that has a tapered diameter that is axially spaced from the first portion, wherein the one of the first and second rotating members with the radially facing surface has an axially projecting spring holding portion with a terminal end and the second portion extends from the terminal end axially to the first portion of the radially facing surface, wherein the first portion of the radially facing surface faces radially inwardly.

40. A pulley structure comprising:
a first rotating member that is rotatable around a first axis;
a second rotating member that is rotatable around the first axis and in at least partial axial coincidence with the first rotating member;
a spring containing chamber defined between the first and second rotating members; and
a spring comprising axially spaced first and second ends defined by coils extending around the first axis,
at least one coil at each of the first and second axially spaced ends of the spring radially biased relative to the first axis thereby to be frictionally held against each of the first and second rotating members to thereby allow forces generated by relative rotation between the first and second rotating members to be transmitted through the spring,
the spring comprising one plurality of coils extending between the coils at the first and second spring ends,
another plurality of coils within the one plurality of coils changing in diameter as the first and second rotating members are relatively rotated,
the spring and first and second rotating members configured so that coils in the another plurality of coils, over a substantial axial extent of the spring, between the first and second spring ends, remain at all times unsupported by and out of contact with the first and second rotating members as the first and second rotating members are rotated relative to each other in operation,
wherein the first end of the spring comprises a first plurality of coils having a first relaxed diameter and at least a first coil in the first plurality of coils is elastically deformed to be changed from the first relaxed diameter to a first loading diameter whereby a resulting residual elastic force radially biases the at least first coil against the first rotating member so that the at least first coil is thereby frictionally held against the first rotating member to follow rotational movement of the first rotating member around the first axis, wherein the second end of the spring comprises a second plurality of coils having a second relaxed diameter and at least a second coil in the second plurality of coils is elastically deformed to be changed from the second relaxed diameter to a second loading diameter whereby a resulting residual elastic force radially biases the at least second coil against the second rotating member so that the at least second coil is thereby frictionally held against the second rotating member to follow rotational movement of the second rotating member around the first axis, wherein one of the first and second rotating members has an axially projecting spring holding portion and at least one coil in one of the first and second plurality of coils exerts a radial holding force on the spring holding portion, wherein the at least one coil exerts a radial outward holding force on the spring holding portion.

41. A pulley structure comprising:

a first rotating member that is rotatable around a first axis;

a second rotating member that is rotatable around the first axis and in at least partial axial coincidence with the first rotating member;

a spring containing chamber defined between the first and second rotating members; and a spring comprising axially spaced first and second ends defined by coils extending around the first axis, at least one coil at each of the first and second axially spaced ends of the spring radially biased relative to the first axis thereby to be frictionally held against each of the first and second rotating members to thereby allow forces generated by relative rotation between the first and second rotating members to be transmitted through the spring, the spring comprising one plurality of coils extending between the coils at the first and second spring ends, another plurality of coils within the one plurality of coils changing in diameter as the first and second rotating members are relatively rotated, the spring and first and second rotating members configured so that coils in the another plurality of coils, over a substantial axial extent of the spring, between the first and second spring ends, remain at all times unsupported by and out of contact with the first and second rotating members as the first and second rotating members are rotated relative to each other in operation, wherein the spring comprises a coil spring with coils, each with a diameter, extending fully between the axially spaced first and second ends and the coils have different diameters with the spring in a relaxed state, wherein one of the first and second rotating members has an axially extending spring holding portion with a radially outwardly facing surface, at least one coil at one of the axially spaced ends has a first diameter that surrounds the radially outwardly facing surface on the spring holding portion and the coil spring has at least a second coil between the axially spaced ends that has a second diameter that is less than the first diameter.

42. The pulley structure according to claim 41 wherein the second coil surrounds the radially outwardly facing surface on the spring holding portion.

43. A pulley structure comprising:

a first rotating member that is rotatable around a first axis;

a second rotating member that is rotatable around the first axis and in at least partial axial coincidence with the first rotating member;

a spring containing chamber defined between the first and second rotating members; and a spring comprising axially spaced first and second ends defined by coils extending around the first axis, at least one coil at each of the first and second axially spaced ends of the spring radially biased relative to the first axis thereby to be frictionally held against each of the first and second rotating members to thereby allow forces generated by relative rotation between the first and second rotating members to be transmitted through the spring, the spring comprising one plurality of coils extending between the coils at the first and second spring ends, another plurality of coils within the one plurality of coils changing in diameter as the first and second rotating members are relatively rotated, the spring and first and second rotating members configured so that coils in the another plurality of coils, over a substantial axial extent of the spring, between the first and second spring ends, remain at all times unsupported by and out of contact with the first and second rotating members as the first and second rotating members are rotated relative to each other in operation, wherein the spring comprises a coil spring with coils, each with a diameter, extending fully between the axially spaced first and second ends and the coils have different diameters with the spring in a relaxed state, wherein one of the first and second rotating members has an axially extending holding portion with a radially inwardly facing surface, at least one coil at one of the axially spaced ends having a first diameter that engages the radially inwardly facing surface on the spring holding portion.

44. The pulley structure according to claim 43 wherein the coil spring has at least a second coil between the axially spaced ends that has a second diameter less than the first diameter.

45. A pulley structure comprising:

a first rotating member that is rotatable around a first axis;

a second rotating member that is rotatable around the first axis and in at least partial axial coincidence with the first rotating member;

a spring containing chamber defined between the first and second rotating members; and a spring comprising axially spaced first and second ends defined by coils extending around the first axis, at least one coil at each of the first and second axially spaced ends of the spring radially biased relative to the first axis thereby to be frictionally held against each of the first and second rotating members to thereby allow forces generated by relative rotation between the first and second rotating members to be transmitted through the spring, the spring comprising one plurality of coils extending between the coils at the first and second spring ends, another plurality of coils within the one plurality of coils changing in diameter as the first and second rotating members are relatively rotated, the spring and first and second rotating members configured so that coils in the another plurality of coils, over a substantial axial extent of the spring, between the first and second spring ends, remain at all times unsupported by and out of contact with the first and second rotating members as the first and second rotating members are rotated relative to each other in operation, wherein the spring is defined by coils extending continuously between the first and second axially spaced ends, the spring has a free end that faces circumferentially and one of the first and second rotating members has a circumferentially facing stop surface that is engageable with the free end of the spring.

46. The pulley structure according to claim 45 wherein the coils have a substantially uniform diameter between the first and second axially spaced ends.

47. The pulley structure according to claim 46 wherein the one of the first and second rotating members has an axially opening, arcuate recess within which the stop surface is located.

48. A pulley structure comprising:
a first rotating member that is rotatable around a first axis;
a second rotating member that is rotatable around the first axis and in at least partial axial coincidence with the first rotating member;
a spring containing chamber defined between the first and second rotating members; and
a spring comprising axially spaced first and second ends defined by coils extending around the first axis,
at least one coil at each of the first and second axially spaced ends of the spring radially biased relative to the first axis thereby to be frictionally held against each of the first and second rotating members to thereby allow forces generated by relative rotation between the first and second rotating members to be transmitted through the spring,
the spring comprising one plurality of coils extending between the coils at the first and second spring ends,
another plurality of coils within the one plurality of coils changing in diameter as the first and second rotating members are relatively rotated,
the spring and first and second rotating members configured so that coils in the another plurality of coils, over a substantial axial extent of the spring, between the first and second spring ends, remain at all times unsupported by and out of contact with the first and second rotating members as the first and second rotating members are rotated relative to each other in operation,
wherein one of the first and second rotating members has a radially facing surface having a non-uniform diameter that engages the spring,
wherein the radially facing surface has a diameter that changes progressively in an axial direction,
wherein the radially facing surface has a spiral shape.

49. The pulley structure according to claim 48 wherein the spring engages the radially facing surface over at least a part of the spiral shape.

50. The pulley structure according to claim 49 wherein the spiral shape has a diameter and the spring has at least one coil with a relaxed diameter that is less than the diameter of at least a part of the spiral shape and must be increased to a loading diameter to allow the spring to engage the radially facing surface over the at least part of the spiral shape.

51. A pulley structure comprising:
a first rotating member that is rotatable around a first axis;
a second rotating member that is rotatable around the first axis and in at least partial axial coincidence with the first rotating member;
a spring containing chamber defined between the first and second rotating members; and
a spring comprising axially spaced first and second ends defined by coils extending around the first axis,
at least one coil at each of the first and second axially spaced ends of the spring radially biased relative to the first axis thereby to be frictionally held against each of the first and second rotating members to thereby allow forces generated by relative rotation between the first and second rotating members to be transmitted through the spring,
the spring comprising one plurality of coils extending between the coils at the first and second spring ends,
another plurality of coils within the one plurality of coils changing in diameter as the first and second rotating members are relatively rotated,
the spring and first and second rotating members configured so that coils in the another plurality of coils, over a substantial axial extent of the spring, between the first and second spring ends, remain at all times unsupported by and out of contact with the first and second rotating members as the first and second rotating members are rotated relative to each other in operation,
wherein the at least one coil has a quadrangular cross-sectional shape and a radially facing surface that frictionally engages the first rotating member, the spring has a circumferentially facing free end and there is a radial gap between the radially facing surface and the first rotating member adjacent to the circumferentially facing free end of the spring.

52. A pulley structure comprising:
a first rotating member that is rotatable around a first axis;
a second rotating member that is rotatable around the first axis and in at least partial axial coincidence with the first rotating member;
a spring containing chamber defined between the first and second rotating members; and
a spring comprising axially spaced first and second ends defined by coils extending around the first axis,
at least one coil at each of the first and second axially spaced ends of the spring radially biased relative to the first axis thereby to be frictionally held against each of the first and second rotating members to thereby allow forces generated by relative rotation between the first and second rotating members to be transmitted through the spring,
the spring comprising one plurality of coils extending between the coils at the first and second spring ends,
another plurality of coils within the one plurality of coils changing in diameter as the first and second rotating members are relatively rotated,
the spring and first and second rotating members configured so that coils in the another plurality of coils, over a substantial axial extent of the spring, between the first and second spring ends, remain at all times unsupported by and out of contact with the first and second rotating members as the first and second rotating members are rotated relative to each other in operation,
wherein one of the coils has a circumferentially facing free end and the first rotating member has a circumferentially facing stop surface that is abuttable to the circumferentially facing free end.

* * * * *